US012688088B2

(12) United States Patent
Lee et al.

(10) Patent No.: US 12,688,088 B2
(45) Date of Patent: Jul. 21, 2026

(54) MEMORY SYSTEM SUPPORTING MULTI-CHANNEL INTERFACE

(71) Applicant: SAMSUNG ELECTRONICS CO., LTD., Suwon-si (KR)

(72) Inventors: Juyeon Lee, Suwon-si (KR); Mingoo Kang, Suwon-si (KR); Hyun-Min Kyung, Suwon-si (KR); Sanghune Park, Suwon-si (KR); Sungcheol Park, Suwon-si (KR); Seungbum Baek, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/804,352

(22) Filed: Aug. 14, 2024

(65) Prior Publication Data

US 2025/0199909 A1 Jun. 19, 2025

(30) Foreign Application Priority Data

Dec. 15, 2023 (KR) ........................ 10-2023-0183005

(51) Int. Cl.
*G06F 11/10* (2006.01)

(52) U.S. Cl.
CPC ...... *G06F 11/1068* (2013.01); *G06F 11/1004* (2013.01)

(58) Field of Classification Search
CPC ............. G06F 11/1068; G06F 11/1004; G06F 11/1012; G06F 3/061; G06F 3/0658;
(Continued)

(56) References Cited

U.S. PATENT DOCUMENTS

| 7,616,133 B2 | 11/2009 | Hollis |
| 8,127,204 B2 | 2/2012 | Hargan |

(Continued)

FOREIGN PATENT DOCUMENTS

| EP | 2048668 A1 | 4/2009 |
| KR | 10-2021-0034660 A | 3/2021 |
| KR | 2457144 B1 | 10/2022 |

OTHER PUBLICATIONS

Extended European Search Report dated May 13, 2025 issued in corresponding European Patent Application No. 24218060.2.
(Continued)

*Primary Examiner* — Thien Nguyen
(74) *Attorney, Agent, or Firm* — Morgan, Lewis & Bockius LLP

(57) ABSTRACT

A memory system includes a host and a memory device configured to transmit and receive data to and from the host through a plurality of channels. The host may include an error correction code (ECC) engine configured to generate ECC parity information corresponding to write data to be transmitted to the memory device, a data bus inversion (DBI) engine configured to generate DBI information corresponding to the write data to be transmitted to the memory device, and a memory controller configured to control the ECC engine and the DBI engine. The plurality of channels may include a data channel group, including a plurality of data channels, and an ECC channel group including a plurality of ECC channels. The DBI information may be transmitted from the host to the memory device through an unused ECC channel in the ECC channel group.

20 Claims, 18 Drawing Sheets

(58) Field of Classification Search
CPC .............. G06F 3/0673; G06F 11/1044; G06F 11/1048; G06F 11/102; G06F 11/1032; G06F 13/1668; G11C 29/42; Y02D 10/00
See application file for complete search history.

(56) References Cited

U.S. PATENT DOCUMENTS

| | | | |
|---|---|---|---|
| 9,979,416 B2 | 5/2018 | Ware et al. | |
| 10,410,694 B1 | 9/2019 | Arbel et al. | |
| 10,860,417 B1 | 12/2020 | Spirkl et al. | |
| 11,221,909 B2 | 1/2022 | Kwak et al. | |
| 11,403,172 B2 | 8/2022 | Whately et al. | |
| 2007/0038789 A1* | 2/2007 | Macri ................... | H03L 7/0816 |
| | | | 710/105 |
| 2009/0110109 A1* | 4/2009 | Skerlj ................... | H04L 1/0057 |
| | | | 375/295 |
| 2011/0222623 A1* | 9/2011 | Hollis ................. | H04L 25/0278 |
| | | | 375/295 |
| 2012/0144276 A1* | 6/2012 | Hargan ............... | G06F 11/1625 |
| | | | 714/E11.032 |
| 2015/0363260 A1* | 12/2015 | Hollis ................. | G06F 11/1004 |
| | | | 714/767 |
| 2019/0138388 A1* | 5/2019 | Hollis ................. | G06F 11/1004 |
| 2020/0081769 A1* | 3/2020 | Riho ..................... | H03M 13/05 |
| 2022/0350713 A1* | 11/2022 | Mula .................. | G06F 11/2007 |
| 2022/0404985 A1 | 12/2022 | Johnson et al. | |
| 2023/0135688 A1* | 5/2023 | Tang .................. | G06F 11/1068 |
| | | | 714/764 |
| 2023/0208446 A1 | 6/2023 | Benisty et al. | |

OTHER PUBLICATIONS

Wagner, "High Bandwidth Memory (HBM3) DRAM", From JEDEC Board Ballot JCB-19-XXX, formulated under the cognizance of the JC-42.2Subcommittee on DRAM Memories, under item No. 1837.98, Rev1.02, pp. 1-288.

* cited by examiner

Figure 8:
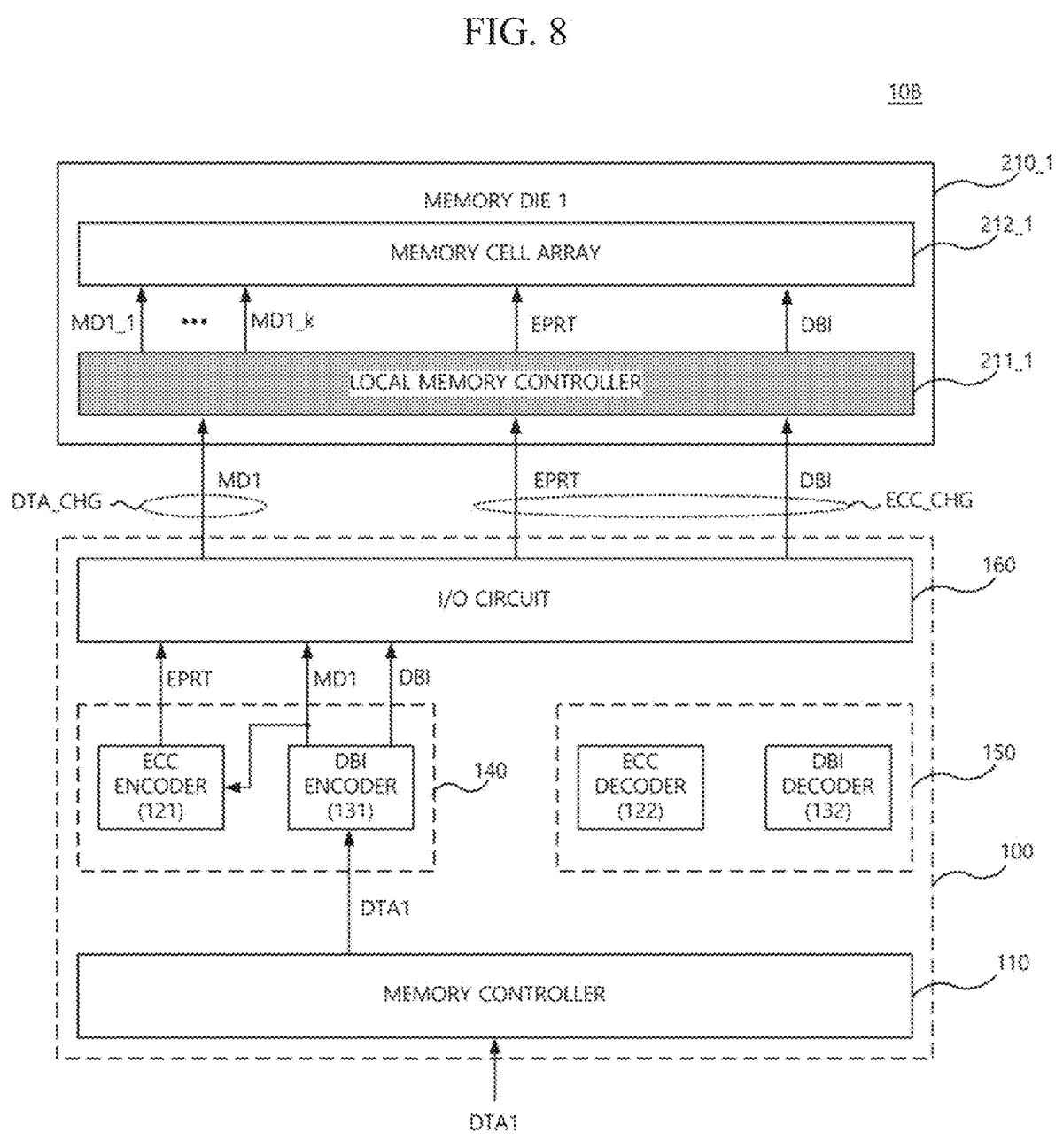

MEMORY DIE 1                                                                  210_1

MEMORY CELL ARRAY                                                            212_1

MD1_1    •••    MD1_k              EPRT              DBI

LOCAL MEMORY CONTROLLER                                                      211_1

DTA_CHG        MD1              EPRT              DBI        ECC_CHG

I/O CIRCUIT                                                                   160

EPRT        MD1    DBI

ECC ENCODER (121)    DBI ENCODER (131)        140        ECC DECODER (122)    DBI DECODER (132)        150

100

DTA1

MEMORY CONTROLLER                                                            110

DTA1

MEMORY SYSTEM SUPPORTING MULTI-CHANNEL INTERFACE

CROSS-REFERENCE TO RELATED APPLICATION(S)

This U.S. non-provisional application claims priority under 35 USC § 119 to Korean Patent Application No. 10-2023-0183005, filed on Dec. 15, 2023, in the Korean Intellectual Property Office, the disclosure of which is herein incorporated by reference in its entirety.

TECHNICAL FIELD

Example embodiments relate to a memory system, and more particularly, to a memory system supporting a multi-channel interface.

DISCUSSION OF RELATED ART

A high-bandwidth memory (HBM), providing wide input/output (I/O) capability in a multi-channel interface manner (a wide parallel interface), is used to support various systems such as graphics, servers, supercomputers, and networks that require high performance and low power consumption.

In general, a high-bandwidth memory (HBM) includes a plurality of memory dies and a buffer die. The buffer die accounts for a considerable portion of power consumed in the high-bandwidth memory (HBM).

SUMMARY

Example embodiments provide a memory system that exhibits improved performance while reducing power consumption.

According to an example embodiment, a memory system includes a host and a memory device configured to transmit and receive data to and from the host through a plurality of channels. The host may include an error correction code (ECC) engine configured to generate ECC parity information corresponding to write data to be transmitted to the memory device, a data bus inversion (DBI) engine configured to generate DBI information corresponding to the write data to be transmitted to the memory device, and a memory controller configured to control the ECC engine and the DBI engine. The plurality of channels may include a data channel group, including a plurality of data channels, and an ECC channel group including a plurality of ECC channels. The DBI information may be transmitted from the host to the memory device through an ECC channel in the ECC channel group that is currently unused for transmitting the ECC parity information is transmitted.

According to an example embodiment, a memory system includes a logic die, a plurality of memory dies stacked on the logic die, and a plurality of channels configured to provide a signal transmission path between the logic die and the plurality of memory dies. The plurality of channels may include a plurality of data channels configured to transmit and receive data and a plurality of ECC channels configured to transmit and receive ECC parity information. An ECC channel among the ECC channels that is currently unused for transmitting the ECC parity information, may be used to transmit and receive DBI information.

According to an example embodiment, a memory system includes a logic chip and a high-bandwidth memory configured to transmit and receive data to and from the logic chip through a plurality of channels and stacked on the logic chip in a vertical direction. The plurality of channels may include a data channel group, including a plurality of data channels, and an ECC channel group comprising a plurality of ECC channels. DBI information may be transmitted from the logic chip to the high-bandwidth memory through an ECC channel in the ECC channel group that is currently unused for transmitting the ECC parity information.

BRIEF DESCRIPTION OF DRAWINGS

The above and other aspects, features, and advantages of the present disclosure will be more clearly understood from the following detailed description, taken in conjunction with the accompanying drawings, in which:

FIG. 4 is a diagram illustrating an example of a DBI encoder of FIG. 3.

FIG. 8 is a diagram illustrating a memory system according to an example embodiment.

FIG. 9A is a diagram illustrating an example of the arrangement of banks and a local memory controller included in a memory cell array of FIG. 8.

FIG. 10 is a diagram illustrating an example of a DBI encoder of FIG. 8.

DETAILED DESCRIPTION

Hereinafter, example embodiments will be described with reference to the accompanying drawings.

Figure 1:
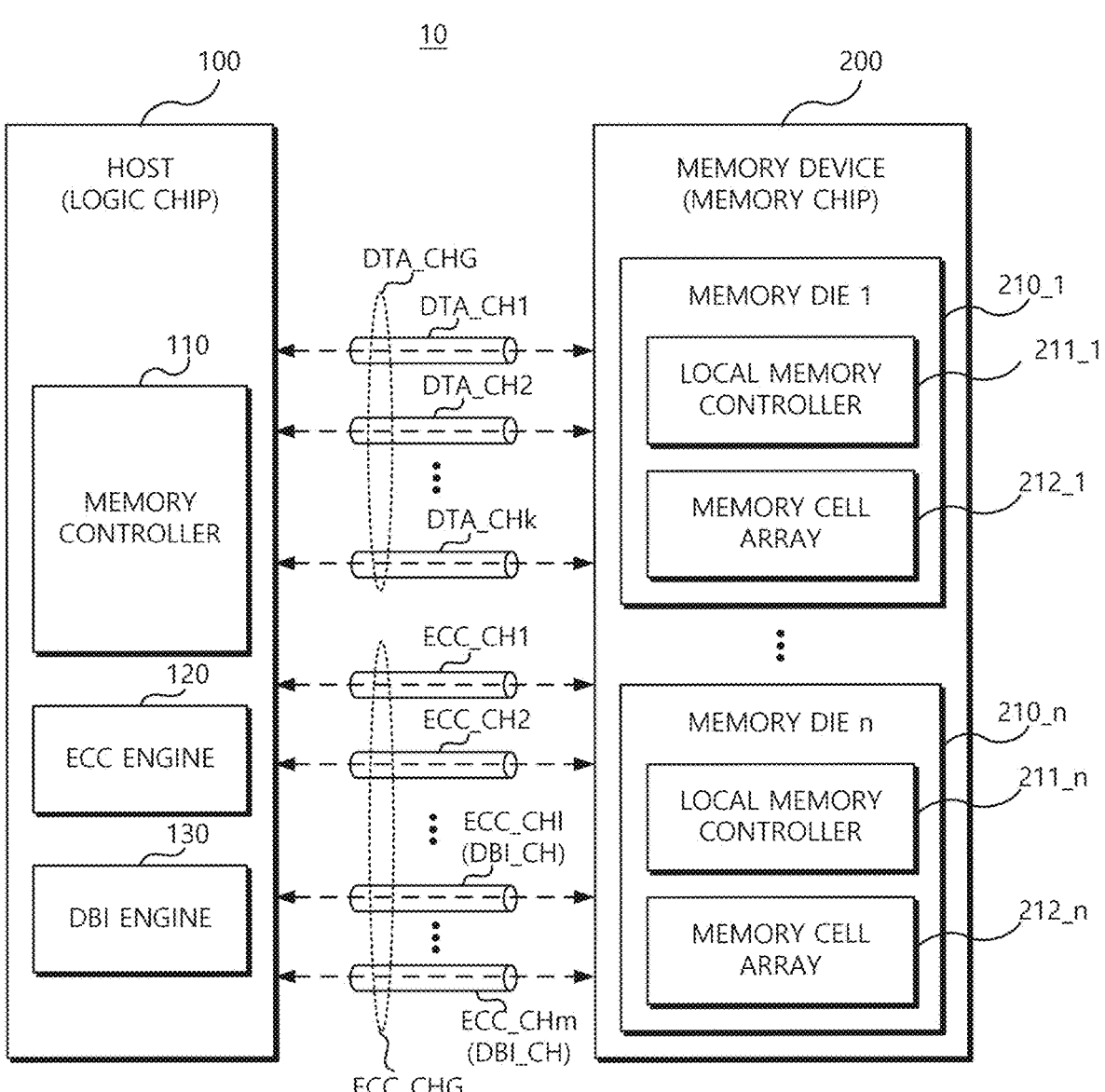
FIG. 1 is a diagram illustrating a memory system according to an example embodiment.

FIG. 1 is a diagram illustrating a memory system 10 according to an example embodiment.

The memory system 10 according to an example embodiment may include a host 100 (e.g., implemented as a logic chip) and a memory device 200 which may be a memory chip, and may provide wide input/output (I/O) operations (a wide parallel data interface) in a multi-channel interface manner between the host 100 and the memory device 200. For example, the host 100 may be provided as a logic chip including operation logic, and the memory device 200 may be provided as a high-bandwidth memory (HBM). The memory system 10 may be an HBM storage device including operation logic.

In addition, the memory system 10 according to an example embodiment may be implemented without a buffer die. In this case, the memory system 10 may use unused ECC channels, i.e., ECC channels that are not currently used to transmit ECC parity information, among a plurality of ECC channels between the host 100 and the memory device 200, for other purposes. Hereafter, such unused ECC channels will be interchangeably referred to as "redundant ECC channels". The memory system 10 may use the redundant ECC channels for transmitting and receiving a data bus inversion (DBI) signal to reduce power consumption.

As described above, the memory system 10 according to an example embodiment may be implemented without a buffer die, and may use the redundant ECC channels for other purposes. Thus, the power consumption of the memory system 10 may be reduced, and the overall performance may be improved.

A more detailed description will now be provided with reference to FIG. 1. The memory system 10 may include a host 100 and a memory device 200.

The host 100 may be implemented to control the overall operation of the memory device 200. For example, the host 100 may be a logic chip and may be implemented as a system-on-chip (SoC) (or as a non-SoC in other examples). The host 100 may include a memory controller 110, an ECC engine 120, and a DBI engine 130.

The memory controller 110 may control the overall operation of the memory device 200. For example, the memory controller 110 may provide a write command and write data instructing the memory device 200 to store data. For example, the memory controller 110 may provide read commands that instruct the memory device 200 to read data.

The ECC engine 120 may perform error correction operations. For example, the ECC engine 120 may include an ECC encoder and an ECC decoder, and may perform an ECC encoding operation and an ECC decoding operation.

For example, during a write operation, the ECC engine 120 may perform an ECC encoding operation on write data and generate ECC parity information. The ECC parity information may be provided to the memory device 200 along with the write data.

During a read operation, the ECC engine 120 may receive read data and ECC parity information from the memory device 200. The ECC engine 120 may perform ECC decoding on the read data using the ECC parity information and generate corrected read data.

The DBI engine 130 may perform a DBI operation. The DBI operation may refer to an operation of inverting all bits of data to be currently transmitted when more than half of the bits are changed based on a result of comparing bits of previously transmitted data and the bits of the data to be currently transmitted. For example, the DBI engine 130 may include a DBI encoder and a DBI decoder, and may perform a DBI encoding operation and a DBI decoding operation.

During a write operation, the DBI engine 130 may perform DBI encoding operation on write data and generate DBI information. The DBI information may be provided to the memory device 200 along with the write data.

For example, during a read operation, the DBI engine 130 may receive DBI information from the memory device 200 and receive corrected read data from the ECC engine 120. The DBI engine 130 may perform a DBI decoding operation on the corrected read data using the DBI information. For example, the DBI engine 130 may determine whether to flip all bits of the corrected read data, based on the DBI information.

The memory device 200 may be implemented to store data. For example, the memory device 200 may be embodied as a memory chip and may be a high-bandwidth memory HBM providing wide input/output in a multi-channel interface manner. The memory device 200 may include a plurality of memory dies 210_1 to 210_n.

Each of the memory dies 210_1 to 210_n may include a local memory controller and a memory cell array. For example, the first memory die 210_1 may include a local memory controller 211_1 and a memory cell array 212_1, and the nth memory die 210_n may include a local memory controller 211_n and a memory cell array 212_n.

Each of the local memory controllers 211_1 to 211_n may control a write/read operation on a corresponding memory cell array. For example, the local memory controller 211_1 of the first memory die 210_1 may control a write/read operation on the memory cell array 212_1, and the local memory controller 211_n of the nth memory die 210_n may control a write/read operation on the memory cell array 212_1.

Each of the memory cell arrays 212_1 to 212_n may include a plurality of memory cells. For example, a plurality of memory cells may be dynamic random access memory (DRAM) cells. However, example embodiments are not limited thereto, and the memory cells may be resistive random access memory (RRAM) cells, ferroelectric random access memory (FRAM) cells, phase change random access memory (PRAM) cells, thyristor random access memory (TRAM) cells, magnetic random access memory (MRAM) cells, or flash memory cells. The following description will focus on an example embodiment in which the memory cells are DRAM cells.

In an example embodiment, the memory device 200 may be implemented without a buffer die. Accordingly, power consumed in the memory system 10 may be saved.

To be more specific, a general high-bandwidth memory (HBM) includes a buffer die, and the buffer die performs an interfacing operation with a host (e.g., a logic chip). For example, when the high-bandwidth memory (HBM) supports a DBI operation, the buffer die includes a DBI decoder and performs a decoding operation based on the DBI information received from the host. In general, the buffer die consumes a significantly large amount of power, up to 50% of the power consumption of the entire memory system.

In contrast, the memory device 200 according to an example embodiment does not include a buffer die. In this case, a control operation or an interfacing operation on each of the memory dies 210_1 to 210_n of the memory device 200 may be performed by the host 100. For example, when a DBI operation is supported, a DBI encoding operation and a DBI decoding operation according to an example embodiment may be performed integrally in the DBI engine 130 of the host 100. As described above, the memory system 10 according to an example embodiment may reduce power consumption because it does not include a buffer die.

Continuing to refer to FIG. 1, a plurality of channels may be provided between the host 100 and the memory device 200.

A portion of the plurality of channels may be provided as data channels DTA_CH1 to DTA_CHn through which write data or read data is transmitted and received. A set of data channels DTA_CH1 to DTA_CHk may be referred to as a data channel group DTA_CHG.

A portion of the plurality of channels may be provided as ECC channels ECC_CH1 to ECC_CHm through which ECC parity information is transmitted and received. A set of ECC channels ECC_CH1 to ECC_CHm may be referred to as an ECC channel group ECC_CHG.

In an example embodiment, unused redundant ECC channels ECC_CH1 to ECC_CHm may be used for purposes other than ECC. For example, redundant ECC channels may be used as DBI channels for power saving. As described above, redundant ECC channels are used as DBI channels, so that the overall performance of the memory system 10 may be improved.

To be more specific, in general, ECC channels between a host and a memory device are provided according to the JEDEC standard specification. In this case, depending on an ECC algorithm used in a memory system, there may be ECC channels that are unused but available. For example, when data transmission is performed based on a basic unit of 'BL Bust Length 8,' 16 bits of ECC channels may be provided according to the JEDEC standard. When single-error correcting and double-error detecting (SECDED) is used as an ECC code, 10 bits of ECC parity information may be required. Accordingly, 6 bits of ECC channels may remain. According to an example embodiment, such redundant ECC channels may be used for purposes such as DBI channels. As a result, the overall performance of the memory system 10 may be improved.

Although not illustrated in FIG. 1, some example processing units of the host 100 may include a central processing unit (CPU), a graphics processing unit (GPU), or an accelerated processing unit (APU), an application processor (AP), or the like.

As described above, the memory system 10 according to an example embodiment may be implemented without a buffer die, and may use redundant ECC channels for other purposes. As a result, the power consumption of the memory system 10 may be reduced, and the overall performance may be improved.

Figure 2:
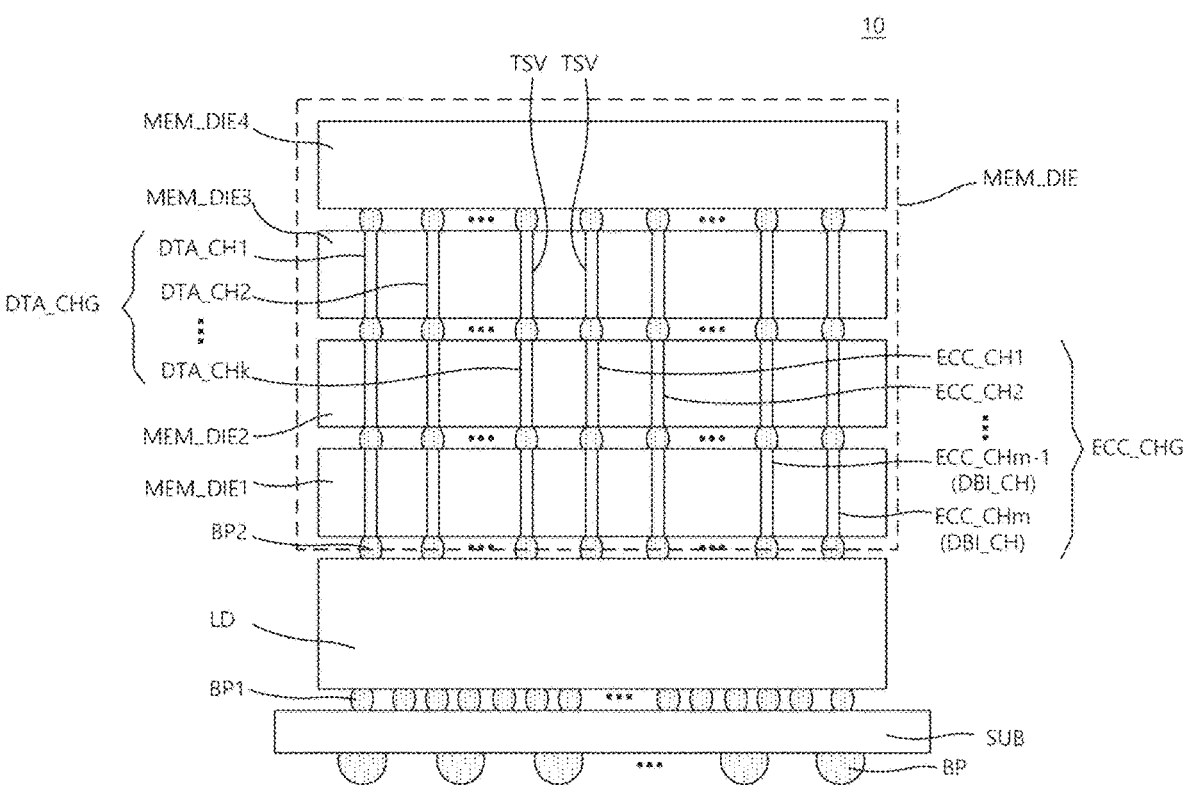
FIG. 2 is an example cross-sectional view of the memory system of FIG. 1.

FIG. 2 is an example cross-sectional view of the memory system 10 of FIG. 1. FIG. 2 illustrates the memory system 10 implemented as a 3D package. For ease of description, an example will be provided in which the memory system 10 of FIG. 2 includes four memory dies MD1 to MD4.

Referring to FIG. 2, the memory system 10 may be implemented in a three-dimensional form including a plurality of dies stacked vertically on a substrate SUB.

The substrate SUB may be electrically connected to an external circuit, such as a printed circuit board (PCB), through internal solder terminals BP.

A logic die LD may be stacked vertically on the substrate SUB. Herein, "vertical" may refer to a direction orthogonal to an upper mounting surface of the substrate SUB (the surface at which mounting bumps BP1 are located). The vertical direction may be the thickness direction of the memory device MD. The logic die LD may be stacked on the substrate SUB0 and electrically connected to the substrate SUB through first bumps BP1. For example, each first bump BP1 may be a micro-bump. Each first bump BP1 may be a conductive bump including copper, cobalt, nickel, or the like.

In an example embodiment, the logic die LD may be implemented as a system-on-chip (SoC). The logic die LD may correspond to the host 100 of FIG. 1.

A plurality of memory dies MD1 to MD4 may be sequentially stacked on the logic die LD in a vertical direction.

Second bumps BP2 may be formed between the plurality of memory dies MD1 to MD4. Each of the plurality of memory dies MD1 to MD4 may be penetrated by a through-silicon via (TSV), and each TSV may have a lower end electrically connected to one of the second bumps BP2 as illustrated. For example, the second bump BP2 may be a micro-bump. The second bump BP2 may be a conductive bump including copper, cobalt, nickel, or the like.

In an example embodiment, the plurality of memory dies MD1 to MD4 may together form a memory device MD. The memory device MD does not include a buffer die, and may correspond to the memory device 200 of FIG. 1.

The logic die LD may be connected to each of the plurality of memory dies MD1 to MD4 through a plurality of channels. The plurality of channels may include a data channel group DTA_CHG and an ECC channel group ECC_CHG. The data channel group DTA_CHG may include a plurality of data channels DTA_CH1 to DTA_CHk, and the ECC channel group ECC_CHG may include a plurality of ECC channels ECC_CH1 to ECC_CHm. FIG. 2 illustrates that each channel includes a TSV. Although not illustrated, a ground conductor or paired conductor may provide a return current path for each TSV and may be considered part of any channel. Any ground or paired conductor may be a TSV itself, and may be dedicated to a single TSV or shared among multiple TSVs.

In an example embodiment, among the plurality of ECC channels ECC_CH1 to ECC_CHm, an unused redundant ECC channel may be used as a DBI channel. In this case, during a write operation, DBI information generated in the logic die LD may be stored in one of the memory dies MD1 to MD4 through the redundant ECC channel. During a read operation, DBI information read from one of the memory dies MD1 to MD4 may be transmitted to the logic die LD through the redundant ECC channel.

As described above, the memory system 10 according to an example embodiment may include a plurality of memory dies MD1 to MD4, vertically stacked on the logic die LD, and may be implemented excluding a buffer die. In this case, the redundant ECC channel may be used for other purposes. As a result, the power consumption of the memory system 10 may be reduced, and the overall performance may be improved.

Hereinafter, memory systems according to an example embodiment, using redundant ECC channels as DBI channels, will be described in more detail.

Figure 3:
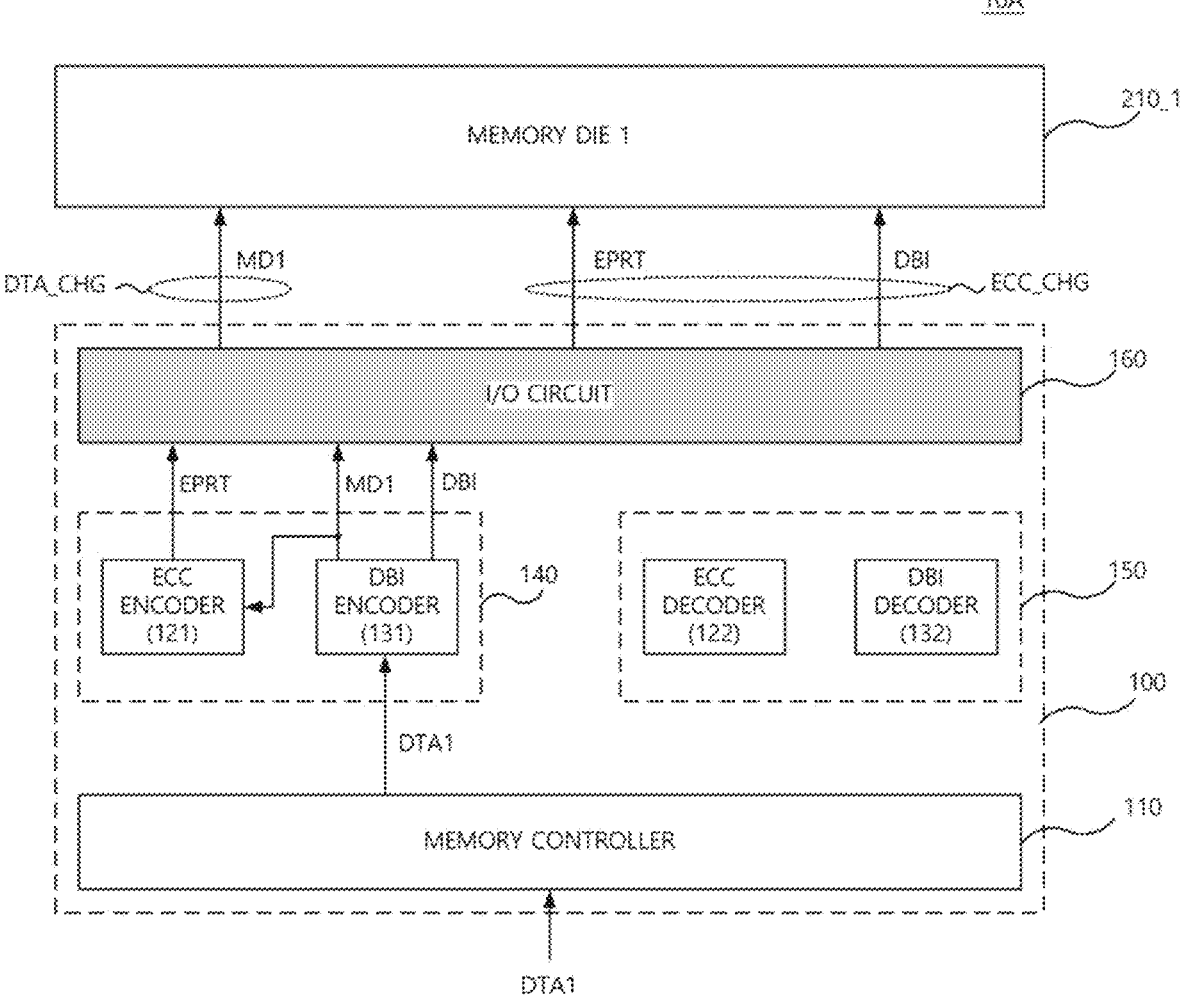
FIG. 3 is a diagram illustrating a memory system according to an example embodiment.

FIG. 3 is a diagram illustrating a memory system 10A according to an example embodiment. FIG. 3 illustrates a memory system 10A that may reduce the power consumption of an input/output circuit 160 during a write operation. For ease of description, an example will be provided in which first main data MD1, ECC parity information EPRT, and DBI information DBI are stored in a first memory die 210_1. The memory system 10A of FIG. 3 is similar to the memory system 10 of FIGS. 1 and 2, and duplicate descriptions will be omitted below.

Referring to FIG. 3, a host 100 may include a memory controller 110, an ECC encoder 121, an ECC decoder 122, a DBI encoder 131, a DBI decoder 132, and an input/output (I/O) circuit 160. The ECC encoder 121 and the ECC decoder 122 may together correspond to the ECC engine 120 of FIG. 1. The DBI encoder 131 and the DBI decoder 132 may together correspond to the DBI engine 130 of FIG. 1.

The memory controller 110 may control the overall operation of the memory system 10A. In addition, the memory controller 110 may provide interfacing with an external source communicating with the memory system 10A. For example, during a write operation, the memory controller 110 may receive the first data DTA1, requested to be written, from the external source and provide the received first data DTA1 to the DBI encoder 131.

The DBI encoder 131 may receive the first data DTA1 from the memory controller 110. Then, the DBI encoder 131 may perform a DBI encoding operation on the first data DTA1 in consideration of a data pattern in the I/O circuit 160. For example, the DBI encoder 131 may determine whether to flip bits of the first data DTA1, in consideration of the data pattern in the I/O circuit 160 and generate the first main data MD1 and DBI information DBI based on the first data DTA1.

The ECC encoder 121 may receive the first main data MD1. The ECC encoder 121 may perform an ECC encoding operation on the first main data MD1 and generate ECC parity information EPRT. For example, hamming code, SECDED, or the like, may be used as ECC algorithm. Other examples for the ECC algorithm may include a scheme such as low-density parity check (LDPC), checksum, or cyclic redundancy check (CRC)

The I/O circuit 160 may provide interfacing between the host 100 and the first memory die 210_1. For example, the I/O circuit 160 may receive and transmit the first main data MD1, the ECC parity information EPRT, and the DBI information DBI to the first memory die 210_1.

In this case, the first main data MD1 may be transmitted through a data channel group DTA_CHG, and the ECC parity information EPRT and the DBI information DBI may be transmitted through an ECC channel group ECC_CHG. For example, the DBI information DBI may be transmitted through redundant ECC channels of the ECC channel group ECC_CHG.

In an example embodiment, to reduce the power consumption of the I/O circuit 160, the DBI encoding operation of the DBI encoder 131 may be performed in consideration of a data pattern of main data previously transmitted by the I/O circuit 160 and the first main data MD1 to be currently transmitted.

For example, bits of the previously transmitted main data and bits of the first main data MD1 to be currently transmitted may be compared with each other. When more than half of the bits have been changed, all bits of the data to be currently transmitted may be flipped. Accordingly, the power consumption of the I/O circuit 160 may be reduced.

To be more specific, in the case of a general memory system, a large amount of power is consumed in an I/O circuit providing interfacing between a logic die and a memory die. For example, a voltage level of the memory die is higher than a voltage level of the logic die, so that a large amount of power is consumed in the I/O circuit when a write operation is performed. For example, the higher a toggle rate of transmitted data, the larger the amount of power consumed in the I/O circuit.

Unlike the general memory system, the DBI encoder 131 according to an example embodiment may determine whether to flip the bits of the data to be currently transmitted, in consideration of the data pattern of the main data previously transmitted by the I/O circuit 160 and the first main data MD1 to be currently transmitted. Accordingly, the toggle rate in the I/O circuit 160 may be decreased. As a result, the power consumption of the I/O circuit 160 may be reduced.

According to an example embodiment, the ECC encoder 121 and the DBI encoder 131 may be implemented together and may be referred to as an encoder circuit 140. The ECC decoder 122 and the DBI decoder 132 may be implemented together and may be referred to as a decoder circuit 150.

Figure 4:
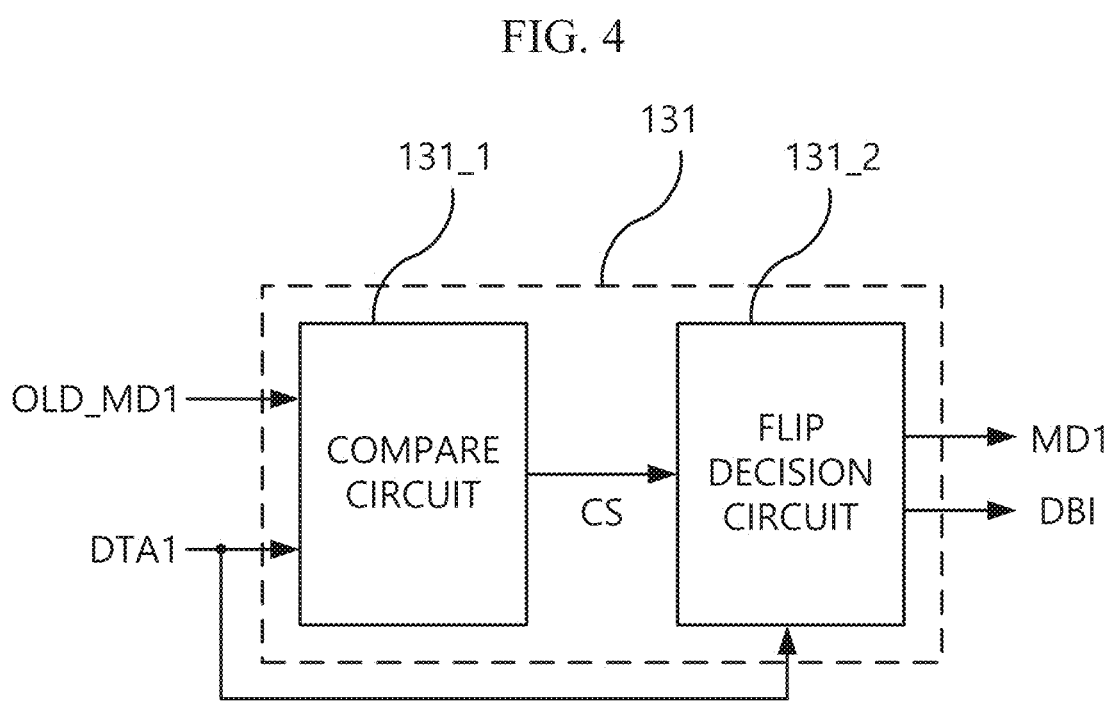
Figure 5A:
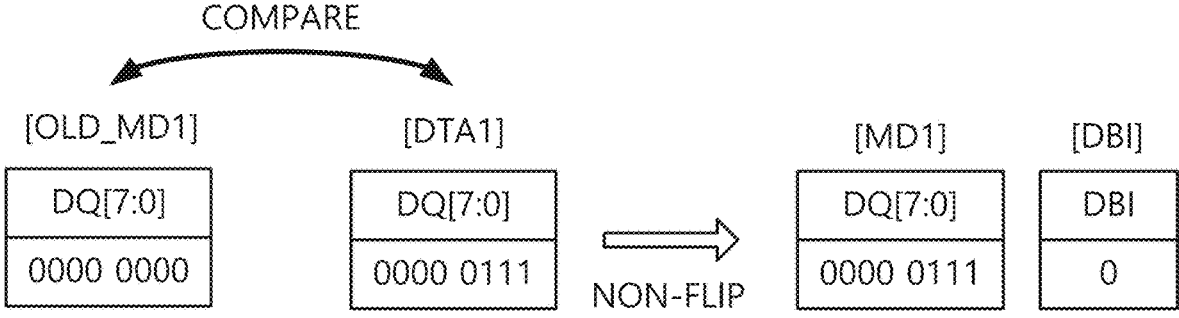
FIGS. 5A and 5B are diagrams illustrating an example of an operation of the DBI encoder of FIG. 3.
Figure 5B:
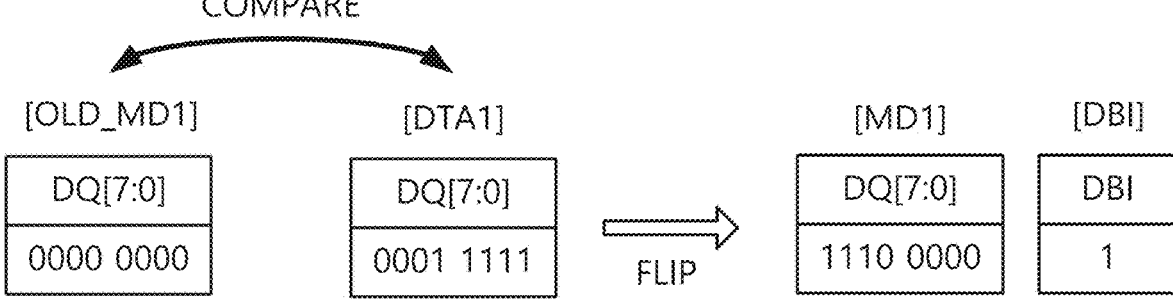

FIG. 4 is a diagram illustrating an example of the DBI encoder 131 of FIG. 3. FIGS. 5A and 5B are diagrams illustrating an example of an operation of the DBI encoder 131 of FIG. 3. For ease of description, an example will be provided in which data to be transmitted from the host 100 to the first memory die 210_1 is 8 bits of data.

Referring to FIG. 4, the DBI encoder 131 may include a compare circuit ("unit") 131_1 and a flip decision circuit ("unit") 131_2, where each may be implemented with logic/ processing circuitry.

The compare circuit 131_1 may receive the first data DTA1 from the memory controller 110. In addition, the compare circuit 131_1 may receive main data, previously transmitted by the I/O circuit 160 (hereinafter referred to as 'first old main data OLD_MD1'), from the memory controller 110.

The compare circuit 131_1 may output a comparison signal CS based on a result of comparing the first data DTA1 and the first old main data OLD_MD1. For example, when less than half of the bits of the first data DTA1 are changed compared with bits of the first old main data OLD_MD1, a comparison signal CS of '0' may be output. When more than half of the bits of the first data DTA1 are changed compared with the bits of the first old main data OLD_MD1, a comparison signal CS of '1' may be output.

The flip decision circuit 131_2 may receive the comparison signal CS and the first data DTA1. The flip decision circuit 131_2 may flip the bits of the first data DTA1 based on the comparison signal CS, or may output the bits of the first data DTA1 without flipping.

For example, when the comparison signal CS is '0,' the flip decision circuit 131_2 does not flip the bits of the first data DTA1 and may output the first data DTA1 as the first main data MD1. In this case, the flip decision circuit 131_2 may output DBI information of '0'.

A more detailed description will now be provided with reference to FIG. 5A. A result of comparing the bits of the first old main data OLD_MD1, which is the data previously transmitted by the input/output circuit 160, and the bits of the first data DTA1 may confirm that less than half of the bits have been changed. In this case, the first main data MD1, which is the same as the first data DTA1, may be output. Here, the DBI information DBI may be a single bit having a value of '0.'

For example, when the comparison signal CS is '1,' the flip decision circuit 131_2 may flip the bits of the first data DTA1 and output the flipped first data DTA1 as the first main data MD1. In this case, the flip decision circuit 131_2 may output DBI information as a single bit representing '1.'

A more detailed description of the latter case will now be provided with reference to FIG. 5B. A result of comparing the bits of the first old main data OLD_MD1, which is the data previously transmitted by the I/O circuit 160, and the bits of the first data DTA1 may confirm that more than half of the bits been changed. In this case, the first main data MD1, in which the bits of the first data DTA1 are flipped, may be output. Here, the DBI information DBI may have a value of '1.'

As described above, the DBI encoding operation may be performed in consideration of a pattern of the data previously transmitted by the I/O circuit 160 and a pattern of the data to be currently transmitted, and thus a toggle rate in the I/O circuit 160 may be significantly decreased. As a result, the power consumed in the I/O circuit 160 may be reduced.

Figure 6:
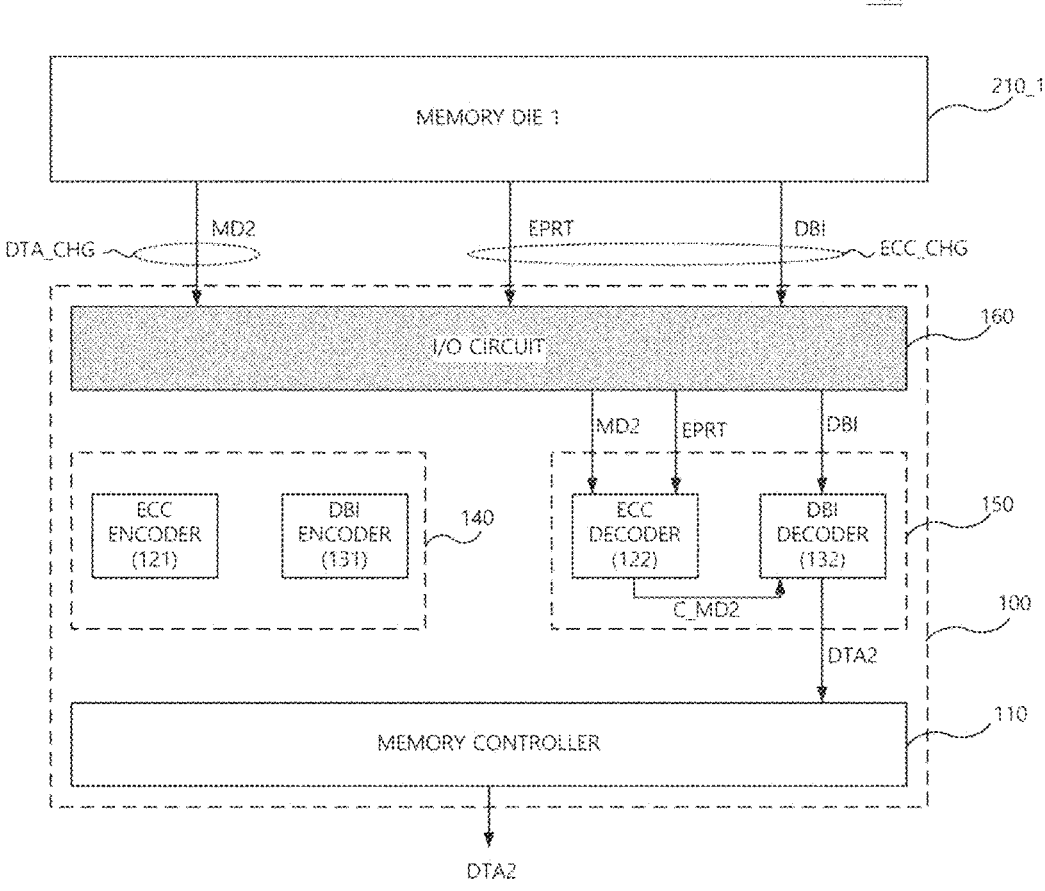
FIGS. 6, 7A and 7B are diagrams illustrating a read operation of the memory system of FIG. 3.
Figure 7A:
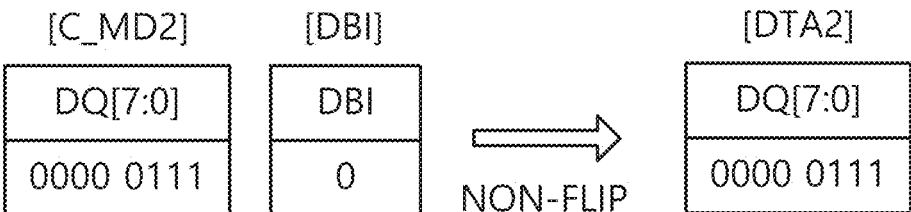
Figure 7B:
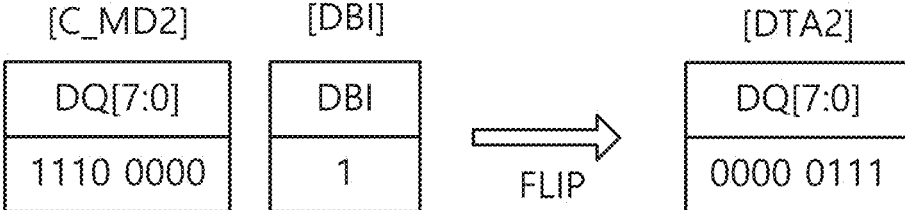

FIGS. 6, 7A, and 7B are diagrams illustrating a read operation of the memory system 10A of FIG. 3. For ease of description, an example will be provided in which a read operation is performed on a second main data MD2 stored in a first memory die 210_1, similarly to FIGS. 3 to 5. An example will also be provided in which second main data MD2 is 8 bits of data.

Referring to FIG. 6, during a read operation, second main data MD2, ECC parity information EPRT, and DBI information DBI stored in the first memory die 210_1 may be transmitted to the I/O circuit 160. In this case, the second main data MD2 may be transmitted through the data channel group DTA_CHG, and the ECC parity information EPRT and DBI information DBI may be transmitted through the ECC channel group ECC_CHG. For example, the DBI information DBI may be transmitted through a redundant ECC channel.

The ECC decoder 122 may receive the second main data MD2 and the ECC parity information EPRT. The ECC decoder 122 may perform an ECC decoding operation on the second main data MD2 based on the ECC parity information EPRT, and may output the corrected second main data C_MD2.

The DBI decoder 132 may receive the DBI information DBI and the corrected second main data C_MD2. The DBI decoder 132 may perform a DBI decoding operation on the corrected second main data C_MD2 based on the DBI information DBI.

As illustrated in FIG. 7A, when the DBI information DBI is '0,' the DBI decoder 132 may not flip bits of the corrected second main data C_MD2. In this case, the second data DTA2 output by the DBI decoder 132 may be the same as the corrected second main data C_MD2.

As illustrated in FIG. 7B, when the DBI information DBI is '1,' the DBI decoder 132 may flip the corrected second main data C_MD2. In this case, bits of the second data DTA2 output by the DBI decoder 132 may be the same as the flipped bits of the corrected second main data C_MD2.

Thereafter, the DBI decoder 132 may transmit the second data DTA2 to the memory controller 110, and the memory controller 110 may output the second data DTA2 as read data.

As described above for FIGS. 3 to 7B, the memory system 10A according to an example embodiment does not include a buffer die, and may perform a DBI operation in consideration of the data pattern in the I/O circuit 160. Accordingly, the power consumption of the memory system 10A may be reduced. In addition, redundant ECC channels may be used as DBI channels, and thus the overall performance of the memory system 10A may be improved.

FIG. 8 is a diagram illustrating a memory system 10B according to an example embodiment. FIG. 8 illustrates a memory system 10B that may reduce the power consumption of a local memory controller within the memory die during a write operation. For ease of description, an example will be provided in which first main data MD1, ECC parity information EPRT, and DBI information DBI are stored in a first memory die 210_1, similarly to FIG. 3. The memory system 10B of FIG. 8 is similar to the memory system 10A of FIG. 3, and duplicate descriptions will be omitted below.

Referring to FIG. 8, the host 100 may include a memory controller 110, an ECC encoder 121, an ECC decoder 122, a DBI encoder 131, a DBI decoder 132, and an I/O circuit 160. The first memory die 210_1 may include a local memory controller 211_1 and a memory cell array 212_1.

The memory controller 110 may control the overall operation of the memory system 10A. In addition, the memory controller 110 may provide interfacing with devices external to the memory system 10A.

The DBI encoder 131 may receive first data DTA1 from the memory controller 110. Thereafter, the DBI encoder 131 may perform a DBI encoding operation on the first data DTA1 in consideration of a data pattern in the local memory controller 211_1. For example, the DBI encoder 131 may determine whether to flip bits of the first data DTA1 in consideration of the data pattern in the local memory controller 211_1, and generate first main data MD1 and DBI information DBI.

In this case, as will be described below, the bits of the first data DTA1 may be divided based on a unit in which the bits of the first data DTA1 are distributed to each bank in the local memory controller 211_1, and a determination on whether the bits of the first data DTA1 have been flipped may be made for each unit in which the bits of the first data DTA1 are distributed.

The ECC encoder 121 may receive the first main data MD1. The ECC encoder 121 may perform an ECC encoding operation on the first main data MD1 and generate ECC parity information EPRT.

The I/O circuit 160 may provide interfacing between the logic chip host 100 and the first memory die 210_1. For example, the I/O circuit 160 may receive and transmit the first main data MD1, the ECC parity information EPRT, and the DBI information DBI to the first memory die 210_1. In this case, although not illustrated, address information designating locations, in which the first main data MD1, the ECC parity information EPRT, and the DBI information DBI are to be stored, may be transmitted together.

The local memory controller 211_1 may receive the first main data MD1, the ECC parity information EPRT, and the DBI information DBI. The local memory controller 211_1 may control a memory cell array 212_1 to store the first main data MD1, the ECC parity information EPRT, and the DBI information DBI.

The memory cell array 212_1 may include a plurality of banks. The plurality of banks of the memory cell array 212_1 may store the first main data MD1, the ECC parity information EPRT, and the DBI information DBI.

In an example embodiment, the first main data MD1 may be distributed to and stored in the plurality of banks of the memory cell array 212_1. For instance, as illustrated in FIG. 8, the first main data MD1 may be divided into first sub-main data to kth sub-main data MD1_1 to MD1_k, and each of the first sub-main data to the kth sub-main data MD1_1 to MD1_k may be stored in a corresponding bank.

In this case, the DBI encoder 131 according to an example embodiment may determine whether to flip the bits of the first data DTA1, based on a unit in which the bits of the first main data MD1 are distributed. Accordingly, the power consumption of the local memory controller 211_1 may be reduced.

To be more specific, in the case of a general memory die, a large amount of power is consumed by a local memory controller controlling a write operation on a memory cell array. For example, the higher a toggle rate of data transmitted to each bank during the write operation, the larger the amount of power consumed by the local memory controller.

Unlike the general memory system, however, the DBI encoder 131 according to an example embodiment may determine whether to flip the bits of the first data DTA1 in consideration of a pattern of sub-main data transmitted to a previously selected bank by the local memory controller 211_1 and a pattern of sub-main data to be transmitted to a currently selected bank.

Thus, a determination on whether to flip the bits of the first data DTA1 may be made in units of sub-main data distributed by the local memory controller 211_1. Accordingly, a toggle rate in the local memory controller 211_1 may be decreased. As a result, the power consumption of the local memory controller 211_1 may be reduced.

Figure 9A:
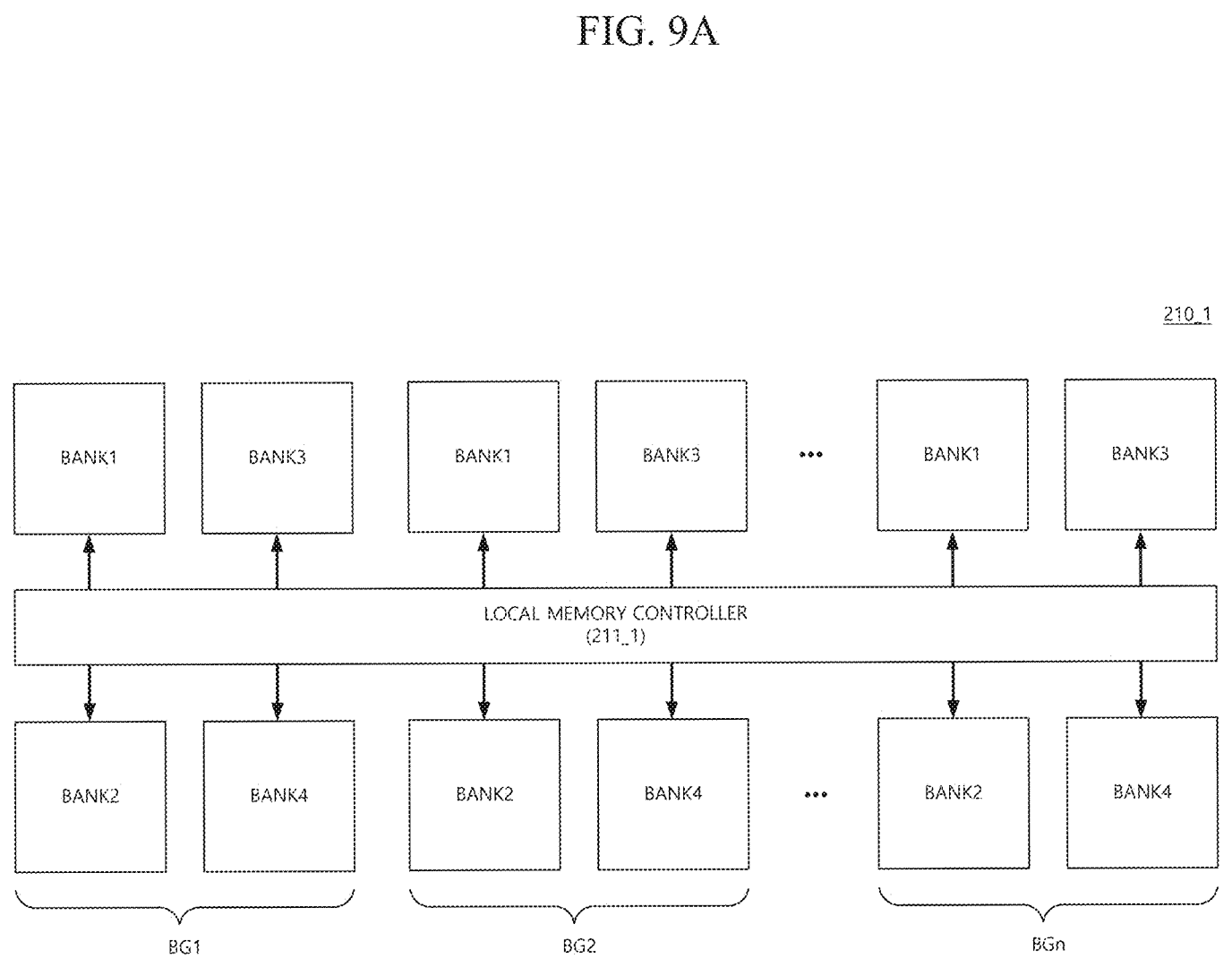
Figure 9B:
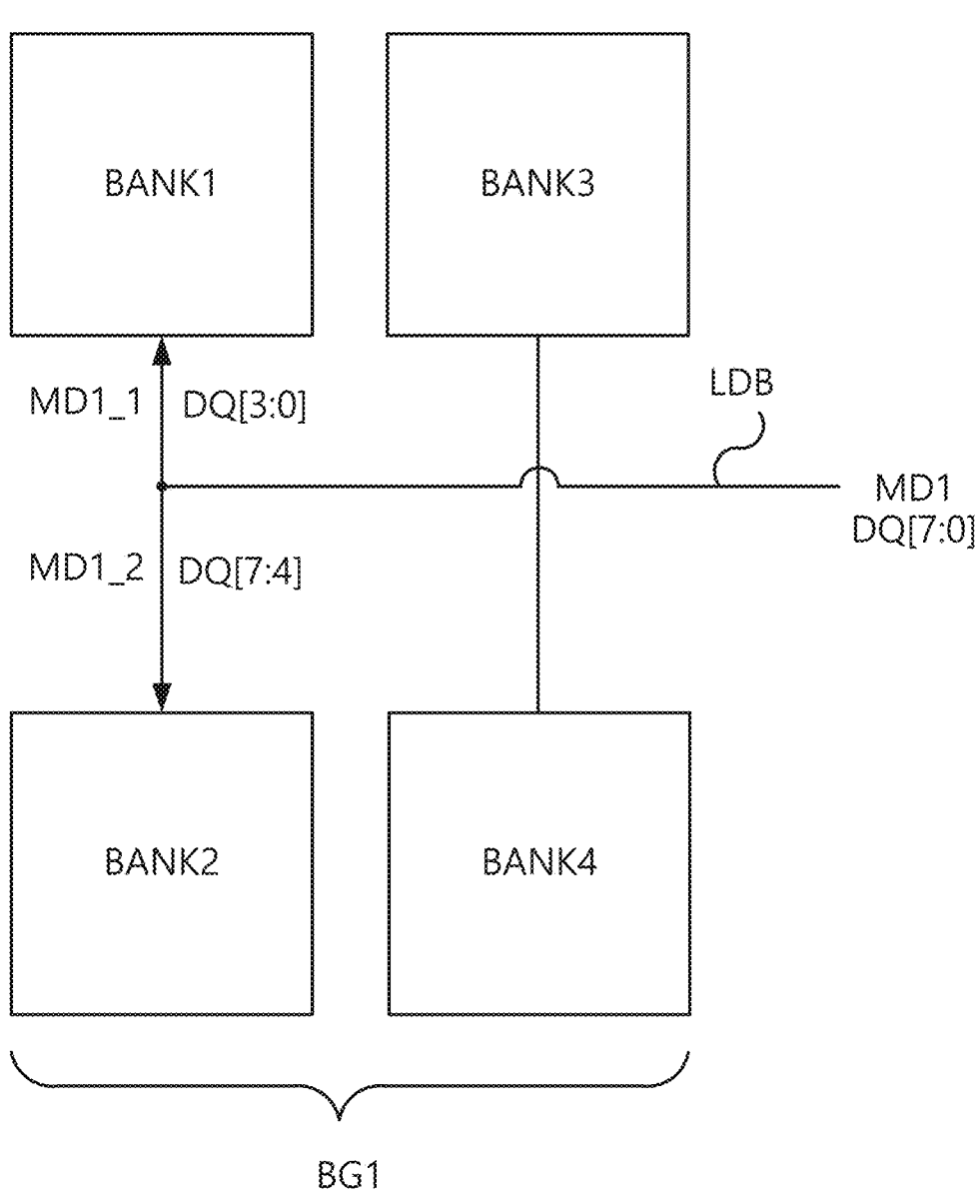
FIG. 9B is a diagram illustrating an example of a local data bus of the local memory controller and corresponding banks.

FIG. 9A is a diagram illustrating an example of the arrangement of the banks and local memory controller 211_1 included in the memory cell array 212_1 of FIG. 8. FIG. 9B is a diagram illustrating an example of a local data bus LDB of the local memory controller 211_1 and corresponding banks. For ease of description, an example will be provided in which 8 bits of first main data MD1 is distributed to and stored in each bank in units of 4 bits.

Referring to FIG. 9A, the memory cell array 212_1 of the first memory die 210_1 may include a plurality of bank groups BG1 to BGn, and each bank group may include a plurality of banks. For example, as illustrated in FIG. 9A, each bank group may include the first to fourth banks BANK1 to BANK4. Each bank may include a plurality of memory cells storing data.

The local memory controller 211_1 may be arranged adjacent to each bank and may control a write/read operation on each bank. For example, the local memory controller 211_1 may be centrally arranged between the banks and may transmit data requested to be written to each bank.

Referring to FIG. 9B, a local data bus LDB of the local memory controller 211_1 may receive first main data MD1 requested to be written. The local data bus LDB may divide the first main data MD1 into sub-main data MD1_1 and sub-main data MD1_2. Then, the local data bus LDB may transmit the 1_1-th sub-main data MD1_1 to the first bank BANK1 and transmit the sub-main data MD1_2 to the second bank BANK2.

When there are many changes in bits of the sub-main data to be currently transmitted compared with bits of the sub-main data previously transmitted to each bank, a toggle rate of data in the local memory controller 211_1 may be increased. As a result, a large amount of power may be consumed. The DBI encoder 131 according to an example embodiment may perform a DBI operation in consideration of a data pattern of the sub-main data previously transmitted to each bank by the local memory controller 211_1. Accordingly, a toggle rate of data in the local memory controller 211_1 may be decreased, and the power consumption of the local memory controller 211_1 may be reduced.

Figure 10:
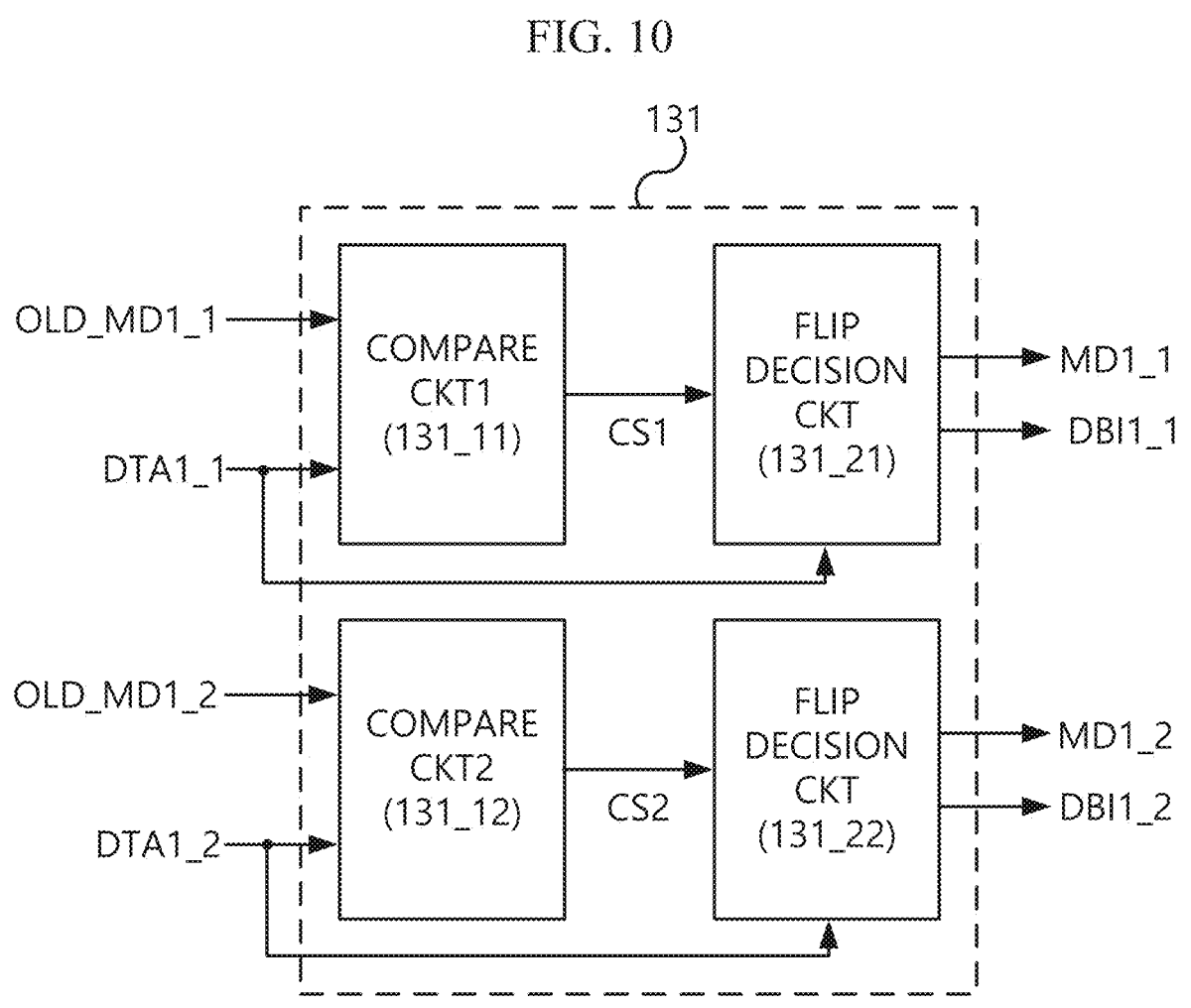
Figure 11A:
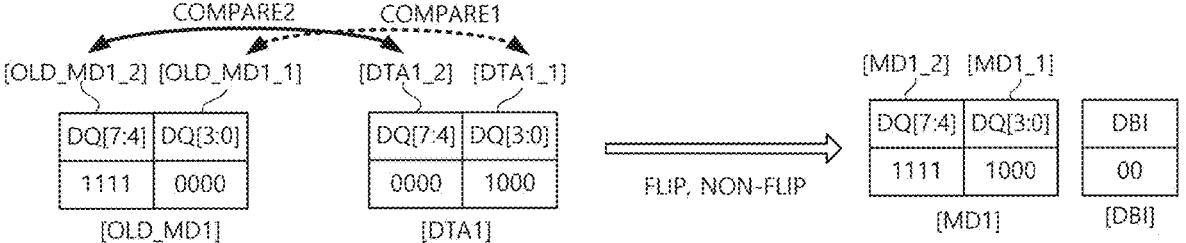
FIGS. 11A and 11B are diagrams illustrating an example of an operation of the DBI encoder of FIG. 8.
Figure 11B:
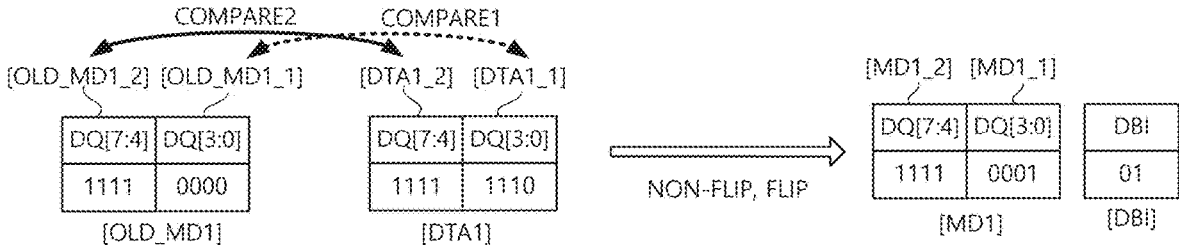

FIG. 10 is a diagram illustrating an example of the DBI encoder 131 of FIG. 8. FIG. 11A and FIG. 11B are diagrams illustrating an example of an operation of the DBI encoder 131 of FIG. 8. The operation of the DBI encoder described in FIGS. 10 and 11 is similar to the operation of the DBI encoder in FIGS. 4 and 5. Therefore, for brevity of description, duplicate descriptions will be omitted below.

Referring to FIG. 10, the DBI encoder 131 may include a first compare circuit ("unit") and a second compare circuit ("unit") 131_11 and 131_11, and a first flip decision circuit ("unit") and a second flip decision circuit ("unit") 131_21 and 131_22.

The first compare circuit 131_11 may receive sub-data DTA1_1 from the memory controller 110. In addition, the first compare circuit 131_11 may receive old sub-main data OLD_MD1_1, associated with the sub-data DTA1_1, from the memory controller 110. The first compare circuit 131_11 may output a first comparison signal CS1 based on a result of comparing the sub-data DTA1_1 and the old sub-main data OLD_MD1_1.

For example, when less than half of bits of the sub-data DTA1_1 are changed compared with bits of the old sub-main data OLD_MD1_1, a first comparison signal CS1 of '0' may be output. When more than half of the bits of the sub-data DTA1_1 are changed compared with the bits of the old sub-main data OLD_MD1_1, a first comparison signal CS1 of '1' may be output.

Similarly, the second compare circuit 131_12 may receive sub-data DTA1_2 from the memory controller 110. In addition, the second compare circuit 131_12 may receive old sub-main data OLD_MD1_2, associated with the sub-data DTA1_2, from the memory controller 110. The second compare circuit 131_12 may output the second comparison signal CS2 based on a result of comparing the sub-data DTA1_2 and the old sub-main data OLD_MD1_2.

The labels of "sub-data DTA1_1" and "sub-data DTA1_2" may facilitate an understanding that bits of the first data DTA1 requested to be written are divided into units distributed to each bank.

For example, as illustrated in FIG. 11A and FIG. 11B, 8 bits of first data DTA1 may be distributed to and stored in a first bank BANK1 and a second bank BANK2. In this case, the first 4 bits of the first data DTA1 corresponding to the first bank BANK1 may be referred to as the sub-data DTA1_1, and the remaining 4 bits of the first data DATA1 may be referred to as the sub-data DTA1_2.

In addition, the old sub-main data OLD_MD1_1 may refer to sub-main data previously transmitted to a bank corresponding to the sub-data DTA1_1. For example, when the sub-data DTA1_1 is stored in the first bank BANK1, the old sub-main data OLD_MD1_1 may be the sub-main data previously transmitted to the first bank BANK1. Similarly, the old sub-main data OLD_MD1_2 may refer to sub-main data previously transmitted to a bank in which the sub-data DTA1_2 is to be transmitted. For example, the old sub-main data OLD_MD1_2 may be sub-main data previously transmitted to the second bank BANK2.

The first flip decision circuit 131_21 may receive the first comparison signal CS1 and the sub-data DTA1_1. The first flip decision circuit 131_21 may flip the bits of the sub-data DTA1_1 or output the bits of the sub-data DTA1_1 without flipping, based on the first comparison signal CS1.

For example, when the first comparison signal CS is '0,' the first flip decision circuit 131_21 does not flip the bits of the sub-data DTA1_1 and may output the sub-data DTA1_1 as sub-main data MD1_1. In this case, the first flip decision circuit 131_21 may output '0' as DBI information DBI1_1.

A more detailed description will now be provided with reference to FIG. 11A. The old sub-main data OLD_MD1_1 may be data previously transmitted to the first bank BANK1 from the local memory controller 211_1. A result of comparing the bits of the old sub-main data OLD_MD1_1 and the bits of the sub-data DTA1_1 may confirm that less than half of the bits have been changed. In this case, the sub-main data MD1_1, which is the same as the sub-data DTA1_1, may be output. Here, a first bit value of the DBI information DBI may be '0.'

For example, when the first comparison signal CS1 is '1,' the first flip decision circuit 131_21 may flip the bits of the sub-data DTA1_1 and may output the flipped sub-data DTA1_1 as the sub-main data MD1_1. In this case, the first flip decision circuit 131_21 may output '1' as the DBI information DBI1_1.

A more detailed description will now be provided with reference to FIG. 11B. A result of comparing the bits of the old sub-main data OLD_MD1_1 and the bits of the sub-data DTA1_1 may confirm that more than half of the bits have been changed. In this case, the sub-main data MD1_1, in which the bits of the sub-data DTA1_1 are flipped, may be output. Here, a first bit value of the DBI information DBI may be '1.'

Similarly, the second flip decision circuit 131_22 may receive a second comparison signal CS2 and sub-data DTA1_2. The second flip decision circuit 131_22 may flip bits of the sub-data DTA1_2 or output the bits of the sub-data DTA1_2 without flipping, based on the second comparison signal CS2.

For example, referring to FIG. 11A and FIG. 11B, a result of comparing the bits of the old sub-main data OLD_MD1_1 and the sub-data DTA1_2 may confirm that less than half of the bits have been changed. In this case, the sub-main data MD1_2, which is the same as the sub-data DTA1_2, may be output. In this case, a second bit value of the DBI information DBI may be '0.'

In contrast, a result of comparing the bits of the 1_2-th old sub-main data OLD_MD1_1 and the sub-data DTA1_2 may confirm that more than half of the bits have been changed. In this case, the sub-main data MD1_2, in which the bits of the sub-data DTA1_2 are flipped, may be output. In this case, a second bit value of the DBI information DBI may be '1.'

As described above, the memory system 10B according to an example embodiment not only omits a buffer die, but also a DBI operation may be performed in consideration of a data pattern of the sub-main data previously transmitted to each bank from the local memory controller 211_1. Accordingly, a toggle rate of the data in the local memory controller 211_1 may be significantly decreased, and the power consumed by the local memory controller 211_1 may be reduced. In addition, redundant ECC channels may be used as DBI channels, and thus the overall performance of the memory system 10B may be improved.

In FIGS. 3 to 11, an example has been provided in which the ECC parity information EPRT is generated based on the first main data MD1. In other examples, the ECC parity information may be generated based on the DBI information DBI to prevent an error in the DBI information DBI.

Figure 12:
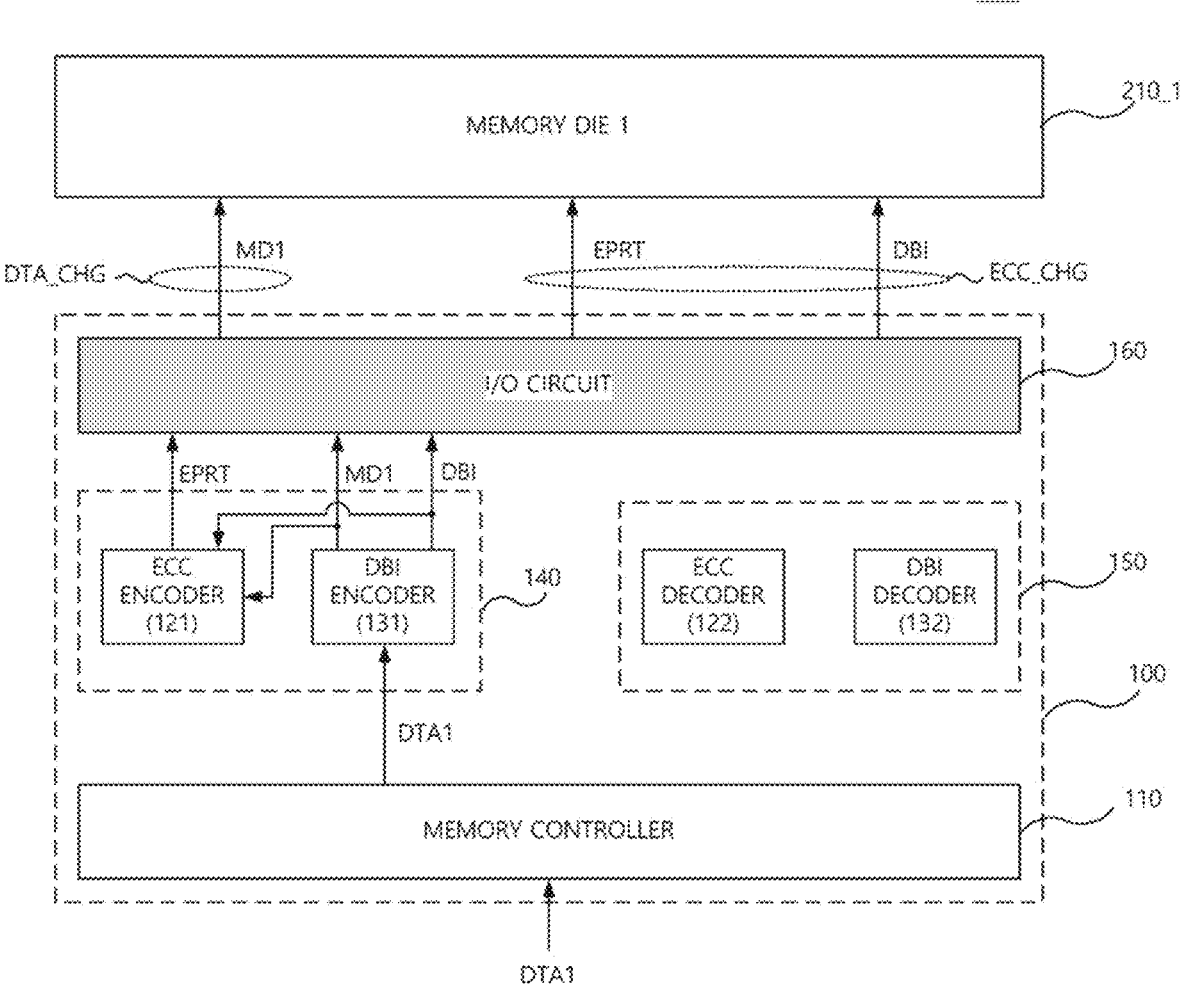
FIG. 12 is a diagram illustrating a memory system according to an example embodiment.

FIG. 12 is a diagram illustrating a memory system 10C according to an example embodiment. FIG. 12 illustrates an example in which ECC parity information EPRT is generated based on first main data MD1 and DBI information DBI. The memory system 10C of FIG. 12 is similar to the memory system 10A of FIG. 3 and FIG. 6. Therefore, redundant descriptions will be omitted below.

Referring to FIG. 12, during a write operation, an ECC encoder 121 may receive the first main data MD1 and the DBI information DBI from a DBI encoder 131. The ECC encoder 121 may generate ECC parity information EPRT based on the first main data MD1 and the DBI information DBI. The ECC parity information EPRT, the first main data MD1, and the DBI information DBI may be stored in a first memory die 210_1.

During a read operation, the ECC decoder 122 may receive second main data MD2, the ECC parity information EPRT, and the DBI information DBI from the first memory die 210_1. The ECC decoder 122 may perform an ECC decoding operation on the second main data MD2 and the DBI information DBI based on the ECC parity information EPRT, and may output corrected second main data C_MD2 and corrected DBI information C_DBI. The DBI decoder 132 may perform a DBI decoding operation on the corrected second main data C_MD2 based on the corrected DBI information C_DBI, and may output the second data DTA2.

As described above, the ECC parity information may be generated based on not only the main data but also the DBI information, which may improve reliability of the memory system 10C. Further, the memory system performs a DBI encoding operation to reduce power consumed by an I/O circuit, and/or performs a DBI encoding operation to reduce power consumed by a local memory controller.

In FIGS. 3 to 12, a description has been provided for memory systems that may reduce power consumption during write operations. The memory system may also/alternatively be implemented to reduce power consumption during a read operation. This will be described in more detail below.

Figure 13:
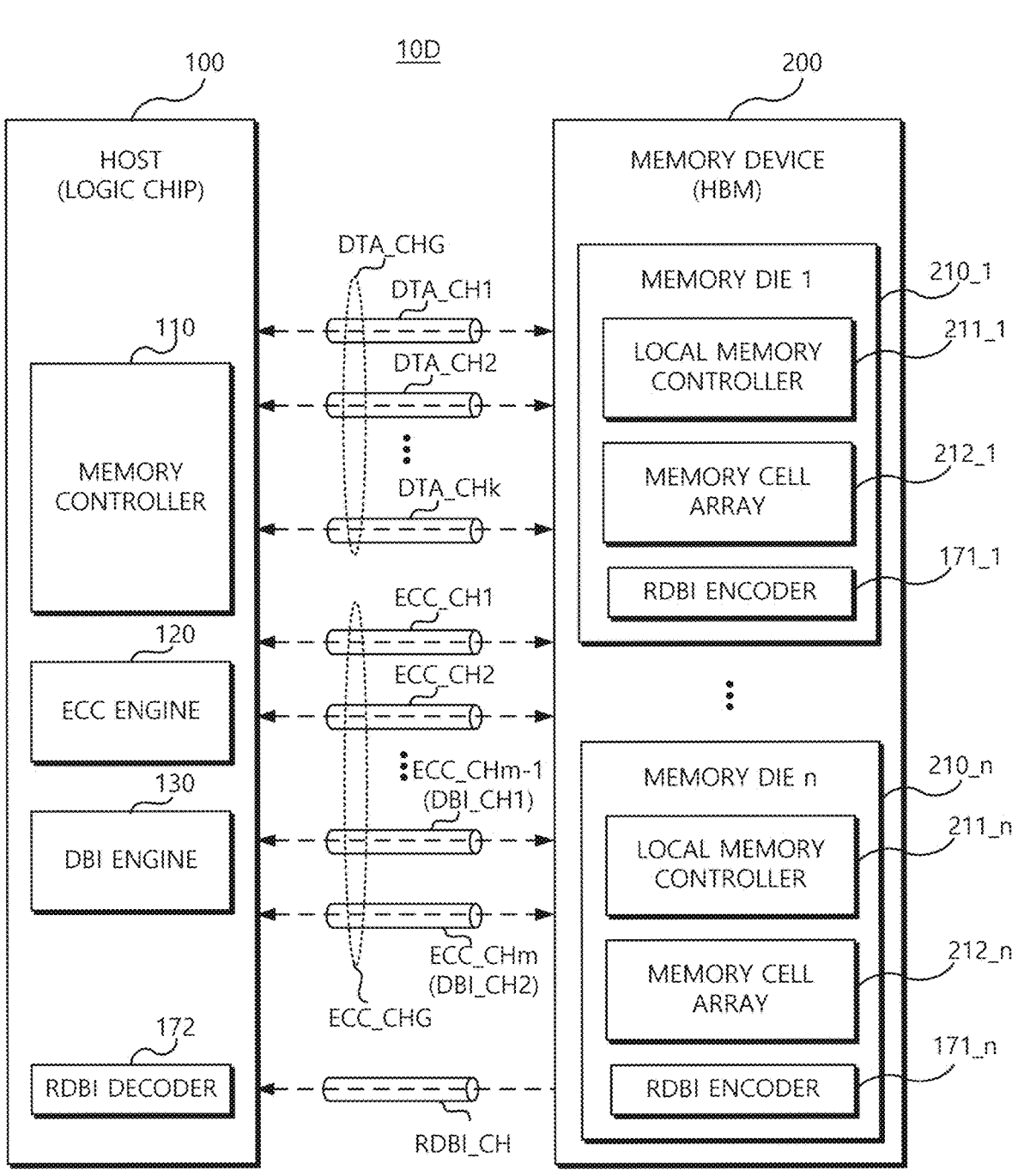
FIG. 13 is a diagram illustrating an example of a memory system according to an example embodiment.

FIG. 13 is a diagram illustrating an example of a memory system 10D according to an example embodiment. The memory system 10D of FIG. 13 is similar to the memory system 10 of FIG. 1. Therefore, the same or similar components are denoted by the same or similar reference numerals, and repetitive descriptions will be omitted below.

Referring to FIG. 13, a memory system 10 may include a host 100 implemented as a logic chip and a memory device 200 corresponding to a memory chip. Unlike the memory system 10 of FIG. 1, memory dies 210_1 to 210_n of the memory device 200 of FIG. 13 may further include read data bus inversion (RDBI) encoders 171_1 to 171_n, and the host 100 may further include an RDBI decoder 172. The RDBI encoder 171_n and the RDBI decoder 172 may transmit and receive RDBI information through an RDBI channel RDBI_CH.

To be more specific, each memory die of the memory device 200 may serve as a transmitter and the host 100 may serve as a receiver during a read operation. In this case, a local memory controller of each memory die, providing interfacing at the transmitter, may consume a relatively large amount of power.

Each of the memory dies 210_1 to 210_n may include an RDBI encoder to reduce the power consumption of each local memory controller during a read operation. Each RDBI encoder may perform a DBI encoding operation on current read data to be transmitted, based on read data previously transmitted to the host 100. In this case, the RDBI information generated by the DBI encoding operation may be transmitted to the host 100 through the RDBI channel RDBI_CH.

The host 100 may include a RDBI decoder 172. During a read operation, the RDBI decoder 172 may receive RDBI information through the RDBI channel RDBI_CH and receive read data through a data channel group DTA_CHG. The RDBI decoder 172 may perform a DBI decoding operation on the received read data based on the RDBI information.

As described above, the memory system 10D according to an example embodiment may support the DBI operation during a read operation. As a result, the power consumption of the memory system 10D may be further reduced.

Figure 14:
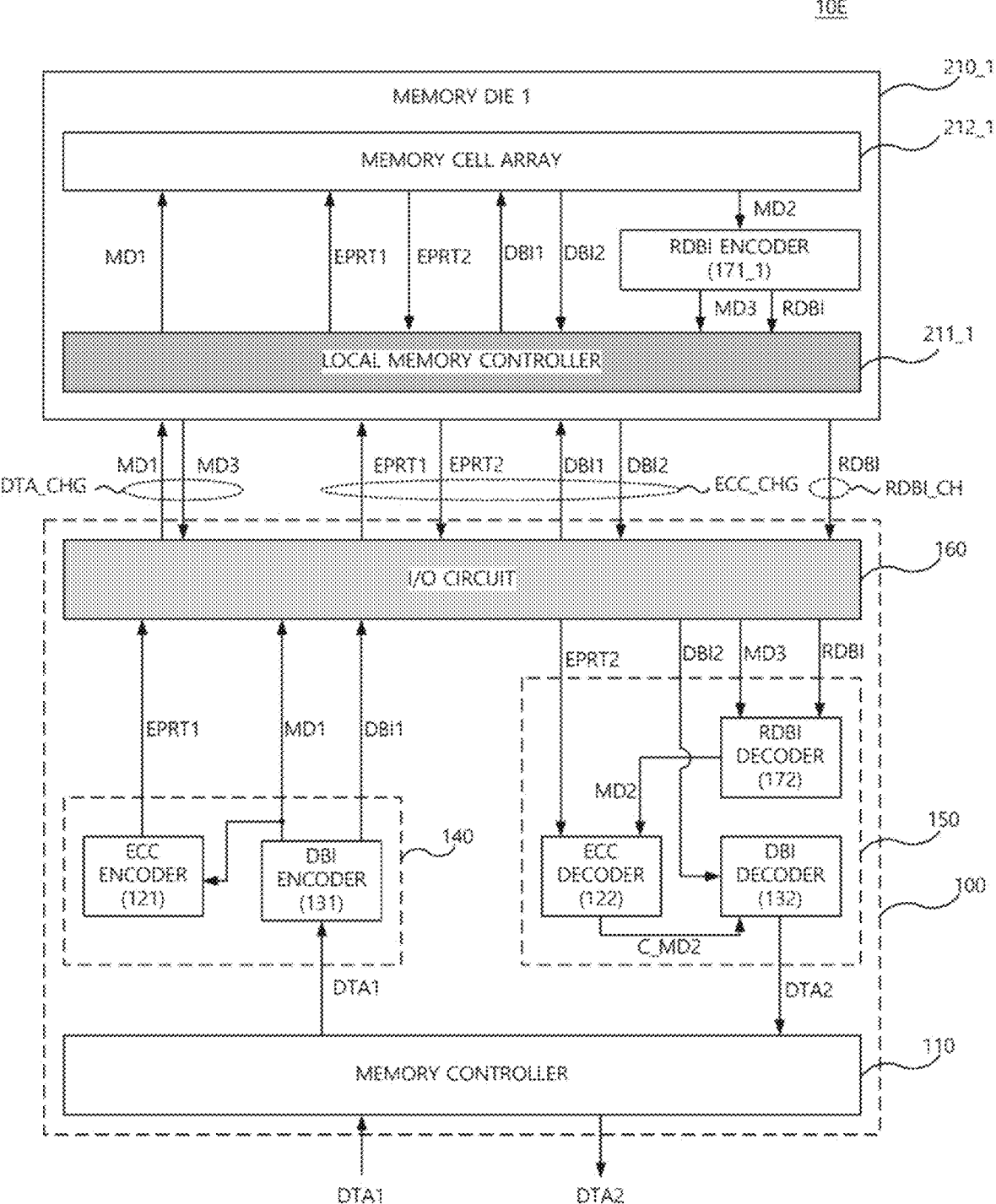
FIG. 14 is a diagram illustrating an example of the memory system of FIG. 13.
Figure 15A:
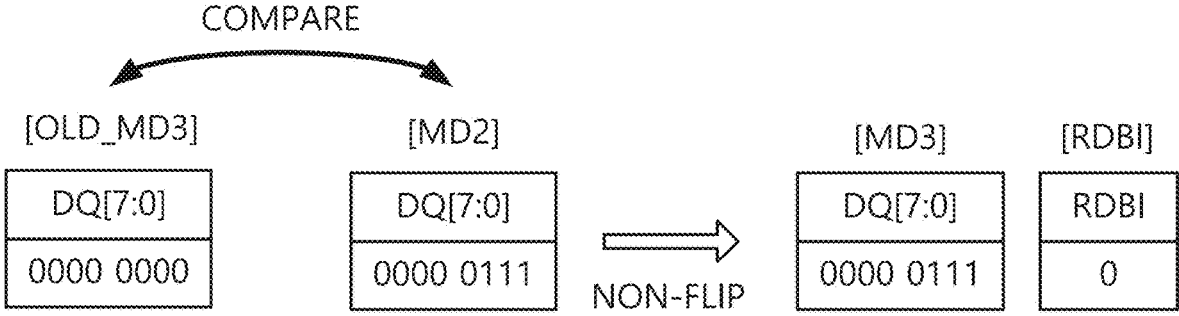
FIGS. 15A and 15B are diagrams illustrating an example of an operation of an RDBI encoder of FIG. 14.
Figure 15B:
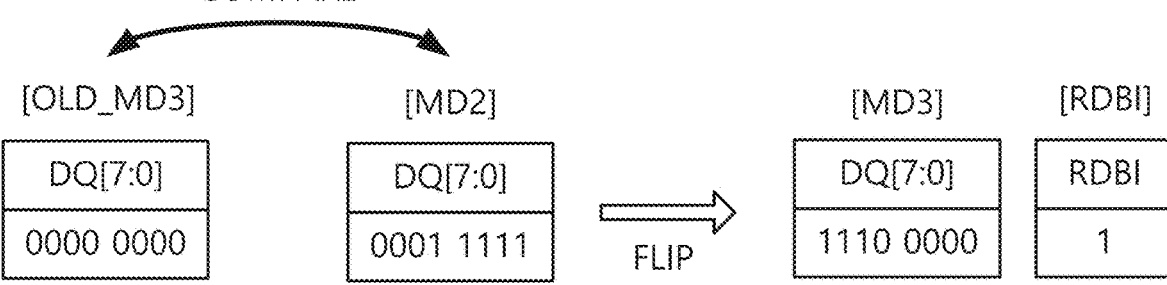
Figure 16A:
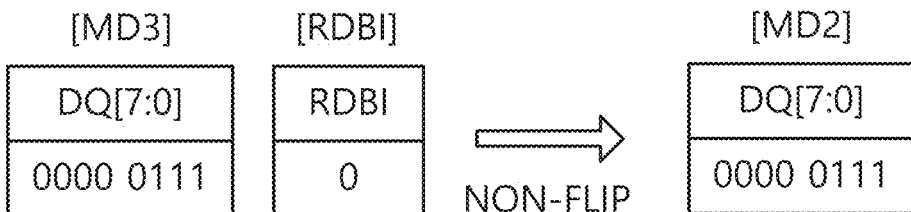
FIGS. 16A and 16B are diagrams illustrating an example of an operation of the RDBI decoder of FIG. 14.
Figure 16B:
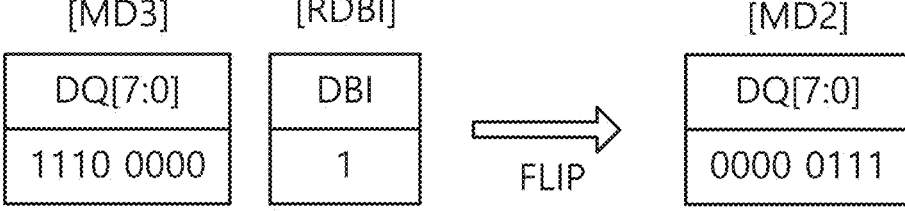

FIG. 14 is a diagram illustrating an example of the memory system 10D of FIG. 13. FIG. 15A and FIG. 15B are diagrams illustrating an example of an operation of the RDBI encoder 171_1 of FIG. 14. FIG. 16A and FIG. 16B are diagrams illustrating an example of an operation of the RDBI decoder 172 of FIG. 14. FIGS. 14 to 16 illustrate a memory system 10D in which a DBI encoding operation is performed to reduce power consumption of an I/O circuit during a write operation and a DBI encoding operation is performed to reduce power consumption of a local memory controller 211_1 during a read operation.

For ease of description, an example will be provided in which first main data MD1, first ECC parity information EPRT1, and first DBI information DBI1 are stored in a first memory die 210_1 during a write operation. An example will also be provided in which the first main data MD1, the first ECC parity information EPRT1, and the first DBI information DBI1 stored in the first memory die 210_1 are read during a read operation. Referring to FIG. 14, a write operation may be performed on first data DTA1.

During a write operation, the memory controller 110 may receive the first data DTA1, requested to be written, from an external source and may provide the received first data DTA1 to a DBI encoder 131.

The DBI encoder 131 may receive the first data DTA1 from a memory controller 110. Then, the DBI encoder 131 may perform a DBI encoding operation on the first data DTA1 in consideration of a data pattern in an I/O circuit 160 and may generate first main data MD1 and first DBI information DBI1.

An ECC encoder 121 may receive the first main data MD1. The ECC encoder 121 may perform an ECC encoding operation on the first main data MD1 and may generate first ECC parity information EPRT1.

The I/O circuit 160 may receive the first main data MD1, the first ECC parity information EPRT, and the first DBI information DBI1. In this case, bits of the first main data MD1 to be currently transmitted and bits of the previously transmitted first main data are similar to each other in the I/O circuit 160. Therefore, a data toggle rate in the I/O circuit 160 may be low. As a result, the power consumption in the I/O circuit 160 may be reduced.

The I/O circuit 160 may transmit the received first main data MD1, first ECC parity information EPRT, and first DBI information DBI1 to the first memory die 210_1. In this case, the first main data MD1 may be transmitted through a data channel group DTA_CHG, and the first ECC parity information EPRT1 and the first DBI information DBI1 may be transmitted through an ECC channel group ECC_CHG. For example, the first DBI information DBI1 may be transmitted through a redundant ECC channel of the ECC channel group ECC_CHG.

The first main data MD1, the first ECC parity information EPRT1, and the first DBI information DBI1 may be stored in the memory cell array 212_1 of the first memory die 210_1.

Then, a read operation may be performed on the second main data MD2 stored in the memory cell array 212_1. In this case, second ECC parity information EPRT2 and second DBI information DBI2 associated with the second main data MD2 may be read together.

For example, the second main data MD2 stored in the first memory die 210_1 may be transmitted to an RDBI encoder 171_1 during a read operation.

The RDBI encoder 171_1 may perform a DBI encoding operation on the second main data MD2 in consideration of a data pattern in the local memory controller 211_1. That is, the RDBI encoder 171_1 may determine whether to flip the bits of the second main data MD2, based on the data patterns of the third main data and the second main data MD2 previously transmitted from the local memory controller 211_1. As a result of DBI encoding, the RDBI encoder 171_1 may generate third main data MD3 and RDBI information RDBI.

For example, as illustrated in FIG. 15A, a result of comparing bits of the third old main data OLD_MD3 and the second main data MD2 that are data previously transmitted from the local memory controller 211_1 may confirm that less than half of the bits have been changed. In this case, the third main data MD3 which is the same as the second main data MD2 may be output, and the RDBI information RDBI may have a value of '0.'

For example, as illustrated in FIG. 15B, a result of comparing bits of the third old main data OLD_MD3 and the second main data MD2 that data previously transmitted from the local memory controller 211_1 may confirm that more than half of the bits have been changed. In this case, the third main data MD3, in which the bits of the second main data MD2 are flipped, may be output and the RDBI information DBI may have a value of '1.'

The local memory controller 211_1 may receive second ECC parity information EPRT2 and the second DBI information DBI2 from the memory cell array 212_1. In addition, the local memory controller 211_1 may receive the third main data MD3 and the RDBI information RDBI from the RDBI encoder 171_1.

In this case, bits of the third main data MD3 to be currently transmitted and the bits of the previously transmitted third main data are similar to each other in the local memory controller 211_1. Therefore, a data toggle rate in the local memory controller 211_1 may be low. As a result, the power consumption in the local memory controller 211_1 may be reduced.

The local memory controller 211_1 may transmit the received third main data MD3, the second ECC parity information EPRT2, the second DBI information DBI2, and the RDBI information RDBI to the I/O circuit 160. Here, the third main data MD3 may be transmitted through the data channel group DTA_CHG, and the second ECC parity information EPRT2 and the second DBI information DBI2 may be transmitted through the ECC channel group ECC_CHG. For example, the second DBI information DBI2 may be transmitted through a redundant ECC channel of the ECC channel group ECC_CHG. The RDBI information RDBI may be transmitted through an additional RDBI channel RCBI_CH provided between the RDBI encoder 171_1 and the RDBI decoder 172.

The RDBI decoder 172 may receive the third main data MD3 and the RDBI information RDBI. The RDBI decoder 172 may perform a DBI decoding operation on the third main data MD3 based on the RDBI information RDBI, and may generate the second main data MD2.

For example, as illustrated in FIG. 16A, when the RDBI information RDBI is '0,' the RDBI decoder 172 may not flip the bits of the third main data MD3. In this case, the second main data MD2 output by the RDBI decoder 172 may be the same as the third main data MD3.

Conversely, as illustrated in FIG. 16B, when the RDBI information RDBI is '1,' the RDBI decoder 172 may flip the third main data MD3. In this case, the bits of the second main data MD2 output by the RDBI decoder 172 may be the flipped bits of the third main data MD3.

The ECC decoder 122 may receive the second main data MD2 and the second ECC parity information EPRT2. The ECC decoder 122 may perform an ECC decoding operation on the second main data MD2 based on the second ECC parity information EPRT2, and may output corrected second main data C_MD2.

The DBI decoder 132 may receive the second DBI information DBI2 and the corrected second main data C_MD2. The DBI decoder 132 may perform a DBI decoding operation on the corrected second main data C_MD2 based on the second DBI information DBI2, and may output the second data DTA2.

Then, the DBI decoder 132 may transmit the second data DTA2 to the memory controller 110, and the memory controller 110 may output the second data DTA2 as read data which has been read.

As described for FIGS. 14 to 16, the memory system 10E according to an example embodiment does not include a buffer die, and may perform a DBI operation in consideration of a data pattern of the I/O circuit 160 serving as a transmitter during a write operation and perform a DBI operation in consideration of a pattern of the local memory controller 211_1 serving as a transmitter during a read operation. Accordingly, the power consumption of the memory system 10E may be further reduced. In addition, redundant ECC channels may be used as DBI channels, and thus the overall performance of the memory system 10E may be improved.

In FIGS. 3 to 16, it has been described that a redundant ECC channel is used as a DBI channel. In other examples, the redundant ECC channel may be used for purposes other than the DBI channel according to example embodiments.

Figure 17:
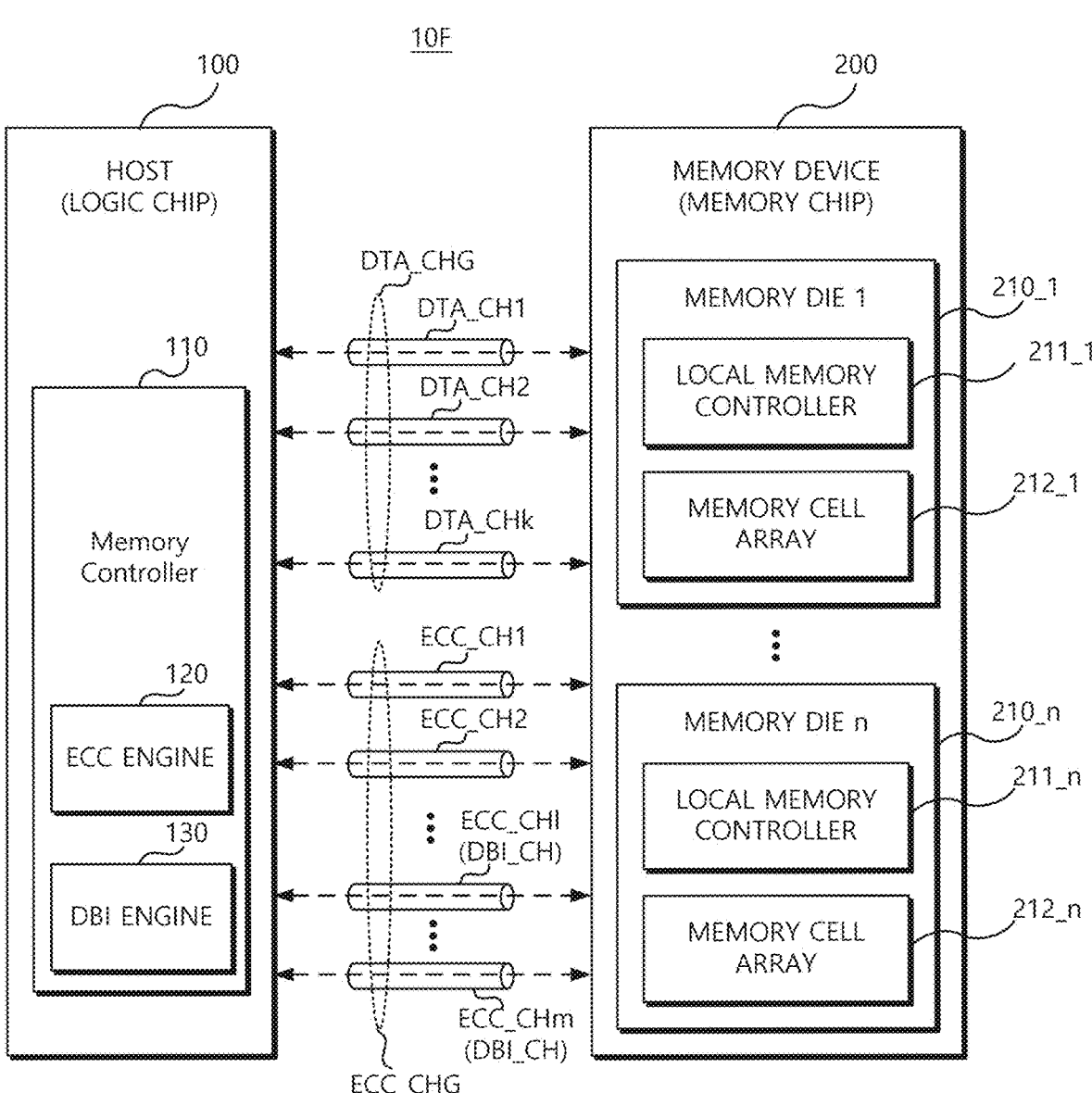
FIG. 17 is a diagram illustrating an example of a memory system according to an example embodiment.

FIG. 17 is a diagram illustrating an example of a memory system according to an example embodiment. A memory system 10F of FIG. 17 is similar to the memory system 10 of FIG. 1. Therefore, the same or similar components are denoted by the same or similar reference numerals, and repetitive descriptions will be omitted below.

In FIGS. 1 to 16, it has been described that the ECC engine 120 and the DBI engine 130 are implemented independently of the memory controller 110. In other examples, e.g., as illustrated in FIG. 17, a memory controller 110 may be implemented to include an ECC engine 120 and a DBI engine 130. In this case, both the encoder circuit 140 (see FIG. 3) and the decoder circuit 150 (see FIG. 3) may be included in the memory controller 110.

As set forth above, a memory system according to example embodiments does not include a buffer die, and ECC channels not currently used for transmitting ECC information, among ECC channels, may be used for other purposes. Accordingly, performance of the memory system may be improved while reducing power consumption of the memory system.

While example embodiments have been shown and described above, it will be apparent to those skilled in the art that modifications and variations could be made without departing from the scope of the present inventive concept as defined by the appended claims.

What is claimed is:

1. A memory system comprising:
a host; and
a memory device configured to transmit and receive data to and from the host through a plurality of channels, wherein,
the host comprises:
    an error correction code (ECC) engine configured to generate ECC parity information corresponding to write data to be transmitted to the memory device;
    a data bus inversion (DBI) engine configured to generate DBI information corresponding to the write data to be transmitted to the memory device; and
    a memory controller configured to control the ECC engine and the DBI engine,
the plurality of channels comprise:
    a data channel group comprising a plurality of data channels; and
    an ECC channel group comprising a plurality of ECC channels, and
the DBI information is transmitted from the host to the memory device through an ECC channel in the ECC channel group that is currently unused for transmitting the ECC parity information based on an ECC algorithm.

2. The memory system of claim 1, wherein
the memory device comprises a plurality of memory dies,
the host is implemented as a logic die stacked vertically on a substrate, and
the plurality of memory dies are stacked vertically on the logic die.

3. The memory system of claim 1, wherein:
the host comprises an input/output (I/O) circuit configured to transmit a data corresponding to the write data, the ECC parity information, and the DBI information to the memory device through the plurality of channels, and
the DBI engine is configured to perform a DBI encoding operation on the write data based on a data pattern in the I/O circuit.

4. The memory system of claim 3, wherein the DBI engine is configured to perform a DBI encoding operation on the write data based on a result of comparing bits of the first data previously transmitted by the I/O circuit and bits of the write data, and to output the main data and the DBI information.

5. The memory system of claim 4, wherein the DBI engine is configured to flip the write data when the bits of the first data and the bits of the write data in the I/O circuit are the same for more than half of the bits of the first data.

6. The memory system of claim 3, wherein the ECC engine is configured to output the ECC parity information after performing an ECC encoding operation on the main data.

7. The memory system of claim 3, wherein the ECC engine is configured to output the ECC parity information after performing an ECC encoding operation on the main data and the DBI information.

8. The memory system of claim 1, wherein:
the ECC engine is configured to receive main data corresponding to read data and ECC parity information corresponding to the read data from the memory device and generate corrected main data by performing an ECC decoding operation on the main data based on the ECC parity information, and
the DBI engine is configured to receive DBI information corresponding to the read data from the memory device, receive the corrected main data from the ECC engine, and perform a DBI decoding operation on the corrected main data based on the DBI information.

9. The memory system of claim 1, wherein:
the host comprises an input/output (I/O) circuit configured to transmit a first data corresponding to the write data, the ECC parity information, and the DBI information to the memory device through the plurality of channels,
the memory device comprises:
a memory cell array comprising a plurality of banks; and
a local memory controller configured to control the memory cell array, and
the DBI engine is configured to perform a DBI encoding operation on the write data based on a data pattern in the local memory controller.

10. The memory system of claim 9, wherein:
the first data comprises a plurality of sub-data respectively corresponding to the plurality of banks, each sub-data of the plurality of sub-data having a portion of bits of the first data, and
the DBI engine is configured to perform a DBI encoding operation on the write data based on a result of comparing bits of a first sub-data of the plurality of sub-data transmitted to a selected bank corresponding to the first sub-data, among the plurality of banks, and first bits to be transmitted to the selected bank, among bits of the write data.

11. The memory system of claim 10, wherein the DBI engine is configured to flip the bits of the write data corresponding to the selected bank when the bits of the first sub-data of the plurality of sub-data corresponding to the selected bank and the bits of the write data corresponding to the selected bank are the same for more than half of the bits of the first sub-data of the plurality of sub-data.

12. The memory system of claim 1, wherein:
the memory device comprises a plurality of memory dies, and
each of the plurality of memory dies comprises:
a memory cell array;
a local memory controller configured to control the memory cell array; and
a read data bus inversion (RDBI) encoder configured to generate first main data and RDBI information by performing a DBI encoding operation on second main data stored in the each of the plurality of memory dies corresponding to a read request from the host.

13. The memory system of claim 12, wherein the host further comprises an RDBI decoder configured to receive the RDBI information, generated by the RDBI encoder, and first main data and perform a DBI decoding operation on the first main data based on the RDBI information.

14. The memory system of claim 13, wherein the RDBI encoder and the RDBI decoder are configured to transmit and receive data through an RDBI channel, different from channels of the ECC channel group.

15. The memory system of claim 12, wherein the RDBI encoder is configured to perform a DBI encoding operation on the second main data based on a data pattern of the local memory controller during a read operation.

16. The memory system of claim 1, wherein the ECC channel that is currently unused for transmitting the ECC parity information is a redundant ECC channel.

17. A memory system comprising:
a logic die;
a plurality of memory dies stacked on the logic die; and
a plurality of channels configured to provide a signal transmission path between the logic die and the plurality of memory dies,
wherein,
the plurality of channels comprise:
a plurality of data channels configured to transmit and receive data; and
a plurality of error correction code (ECC) channels configured to transmit and receive ECC parity information, and
an ECC channel among the plurality of ECC channels, currently unused for transmitting the ECC parity information, is used to transmit and receive data bus inversion (DBI) information based on an ECC algorithm.

18. The memory system of claim 17, wherein the logic die comprises:
an ECC engine configured to generate ECC parity information corresponding to write data to be transmitted to a selected memory die among the plurality of memory dies;
a DBI engine configured to generate DBI information corresponding to the write data;
a memory controller configured to control the ECC engine and the DBI engine; and
an input/output (I/O) circuit configured to transmit main data corresponding to the write data, the ECC parity information, and the DBI information to the plurality of memory dies through the plurality of channels, and
the DBI engine is configured to perform a DBI encoding operation on the write data based on a data pattern in the I/O circuit.

19. The memory system of claim 17, wherein the logic die comprises:
an ECC engine configured to generate ECC parity information corresponding to write data to be transmitted to a selected memory die among the plurality of memory dies;
a DBI engine configured to generate DBI information corresponding to the write data; and
a memory controller configured to control the ECC engine and the DBI engine,
each of the plurality of memory dies comprises:
a memory cell array comprising a plurality of banks; and
a local memory controller configured to control the memory cell array, and
the DBI engine is configured to perform a DBI encoding operation on the write data based on a data pattern in the local memory controller.

20. A memory system comprising:
a logic chip; and
a high-bandwidth memory configured to transmit and receive data to and from the logic chip through a plurality of channels and stacked on the logic chip in a vertical direction,
wherein,
the plurality of channels comprise:
a data channel group comprising a plurality of data channels; and
an error correction code (ECC) channel group comprising a plurality of ECC channels, and
data bus inversion (DBI) information is transmitted from the logic chip to the high-bandwidth memory through an ECC channel in the ECC channel group, currently unused for transmitting ECC parity information based on an ECC algorithm.

* * * * *